(12) United States Patent
    Halls

(10) Patent No.: US 9,350,851 B1
(45) Date of Patent: May 24, 2016

(54) OVERRIDING VOLUME SETTINGS ON A MOBILE DEVICE

(71) Applicant: Alan Halls, Lehi, UT (US)

(72) Inventor: Alan Halls, Lehi, UT (US)

(*) Notice: Subject to any disclaimer, the term of this patent is extended or adjusted under 35 U.S.C. 154(b) by 0 days.

(21) Appl. No.: 14/527,337

(22) Filed: Oct. 29, 2014

(51) Int. Cl.
  *H04W 76/00* (2009.01)
  *H04M 1/725* (2006.01)
  *H04W 4/02* (2009.01)

(52) U.S. Cl.
  CPC ...... *H04M 1/72563* (2013.01); *H04M 1/72536* (2013.01); *H04W 4/028* (2013.01); *H04W 76/007* (2013.01)

(58) Field of Classification Search
  None
  See application file for complete search history.

(56) References Cited

U.S. PATENT DOCUMENTS

| 7,606,561 | B2 | 10/2009 | Mathew et al. |
| 8,576,828 | B1 | 11/2013 | Massey, Jr. |
| 2007/0207839 | A1* | 9/2007 | Buti et al. ............ 455/567 |
| 2007/0254633 | A1* | 11/2007 | Mathew et al. ....... 455/412.1 |
| 2009/0170486 | A1* | 7/2009 | Culbert et al. ........ 455/415 |
| 2009/0216564 | A1* | 8/2009 | Rosenfeld ............. 705/3 |
| 2010/0138858 | A1* | 6/2010 | Velazquez et al. ..... 725/33 |

FOREIGN PATENT DOCUMENTS

CA          2579916 C     3/2014

* cited by examiner

*Primary Examiner* — Nizar Sivji
(74) *Attorney, Agent, or Firm* — Brian Tucker; Kirton McConkie

(57) ABSTRACT

The volume settings of a mobile device can be overridden when a notification is received to allow a user to be immediately notified of an emergency or urgent matter. Each mobile device can be assigned a unique number which is used by other computing devices to send alerts to the mobile device. Each mobile device can also be assigned an emergency code that other computing devices use to override the mobile device's volume settings. When a mobile device receives a notification that includes its assigned emergency code, the mobile device can override the current volume settings so that the sound associated with the receipt of the notification will be audibly output. A remote map code may also be used to retrieve the location of a mobile device. A group emergency code or remote map code may be employed to notify or locate a group of mobile devices.

17 Claims, 26 Drawing Sheets

OVERRIDING VOLUME SETTINGS ON A MOBILE DEVICE

CROSS-REFERENCE TO RELATED APPLICATIONS

Not Applicable.

BACKGROUND

Mobile phones and other mobile devices include volume settings which allow the user to control the volume of various audio outputs including a ringer and notification volume. In many situations such as in the evening or when in a meeting or class, the user will turn off the volume of such audio outputs so that the phone will not output a disruptive sound when a phone call or notification is received. The user will often leave the phone in this muted state for extended periods of time.

When the volume is turned off, many phones provide an option to cause the phone to vibrate when an incoming phone call or message is received. However, if the user has turned off the volume, it is likely that the user is in a situation where he or she will not immediately check the phone in response to a vibration. For this reason, when the phone's volume is turned off, it can be difficult to notify the user of an emergency or urgent matter.

BRIEF SUMMARY

The present invention extends to methods, systems, and computer program products for overriding the volume settings of a mobile device to allow a user to be immediately notified of an emergency or urgent matter. Each mobile device can be assigned a unique identifier which can be used by other computing device, including other mobile devices, to send alerts to the mobile device. Each mobile device can also be assigned an emergency code that other computing devices use to override the mobile device's volume settings. When a mobile device receives a notification that includes its assigned emergency code, the mobile device can override the current volume settings so that the sound associated with the receipt of the notification will be audibly output. In this way, the user of the device sending the notification can cause the receiving device to output a sound even if the receiving device's volume is turned off.

Each mobile device may also be assigned a remote map code that other computing devices use to obtain a location of the mobile device. When a mobile device receives a notification that includes its assigned remote map code, the mobile device can respond by sending its current location. In this way, in addition to notifying a user of an emergency or urgent matter, other users can identify the current location of the user.

When a mobile device receives a notification, the mobile device can prompt the user to acknowledge the notification. Once the user acknowledges the notification, a confirmation can be sent back to the computing device that sent the notification. If the notification was a request for a phone call and the computing device that sent the notification has phone capabilities, the computing device can respond to the confirmation by automatically initiating the phone call. Alternatively, if the computing device that sent the notification does not have phone capabilities, an indication can be displayed to the user of the computing device to inform the user that a phone call can now be manually made.

In some embodiments, various functionalities of the mobile device can be disabled until the user has acknowledged the notification. In some embodiments, messages can be sent to a group of mobile devices. In this way, a user can send a single notification to alert all users in the group. Similarly, a user can send a single request to retrieve the location of all users in the group.

In one embodiment, the present invention is implemented as one or more computer storage media storing computer executable instructions which when executed on a first computing device and a second mobile device implement a method for causing the second mobile device's volume settings to be overridden in response to receiving a notification from the first computing device thereby allowing an alert to be audibly output to notify a user of the received notification. A first computing device stores a unique identifier and an emergency code associated with the second mobile device. The first computing device receives a user request to send a notification to the second mobile device. The first computing device transmits the notification to the second mobile device. The notification includes the unique identifier and the emergency code associated with the second mobile device. The second mobile device receives the notification. The second mobile device then compares the emergency code included in the notification to an emergency code stored on the second mobile device. Upon determining that the emergency code included in the notification matches the emergency code stored on the second mobile device, the second mobile device adjusts a volume setting on the second mobile device so that an alert that is generated in response to receiving the notification will be audibly output to immediately notify a user of the second mobile device that the notification was received.

In another embodiment, the present invention is implemented as one or more computer storage media storing computer executable instructions which when executed on a mobile device implement a method for causing the mobile device's volume settings to be automatically adjusted in response to receiving a notification from another computing device. The mobile device stores a unique identifier, an emergency code, and a dismiss alert code. The mobile device receives, from another computing device, a notification that includes the unique identifier and an emergency code. The mobile device compares the emergency code included in the notification to the emergency code stored on the mobile device. Upon determining that the emergency code included in the notification matches the emergency code stored on the mobile device, the mobile device adjusts a volume setting on the mobile device so that the mobile device will output an audible sound when an alert is generated on the mobile device. The mobile device generates an alert indicating that the notification was received. The alert comprises a visible alert that is displayed on a display of the mobile device and an audible alert that is output from a speaker of the mobile device. The visible alert includes a field for receiving the dismiss alert code. The mobile device receives input of the dismiss alert code into the field. The mobile device then ceases the output of the audible alert.

In another embodiment, the present invention is implemented as a method for a first computing device to cause a volume setting of a second mobile device to be overridden so that a first user of the first computing device can immediately contact a second user of the second mobile device even when the volume setting of the second mobile device is set to silent. The first computing device receives input from the first user that requests that a notification be sent to the second mobile device. The first computing device sends the notification to the second mobile device. The notification includes a unique identifier and an emergency code that causes the volume setting of the second mobile device to be set to an audible level so that an alert is audibly output when the second mobile device receives the notification. The first computing device receives an acknowledgement from the second mobile device. The acknowledgement identifies that the second user acknowledged the alert.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Embodiments of the present invention may comprise or utilize special purpose or general-purpose computers including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

Figure 1:
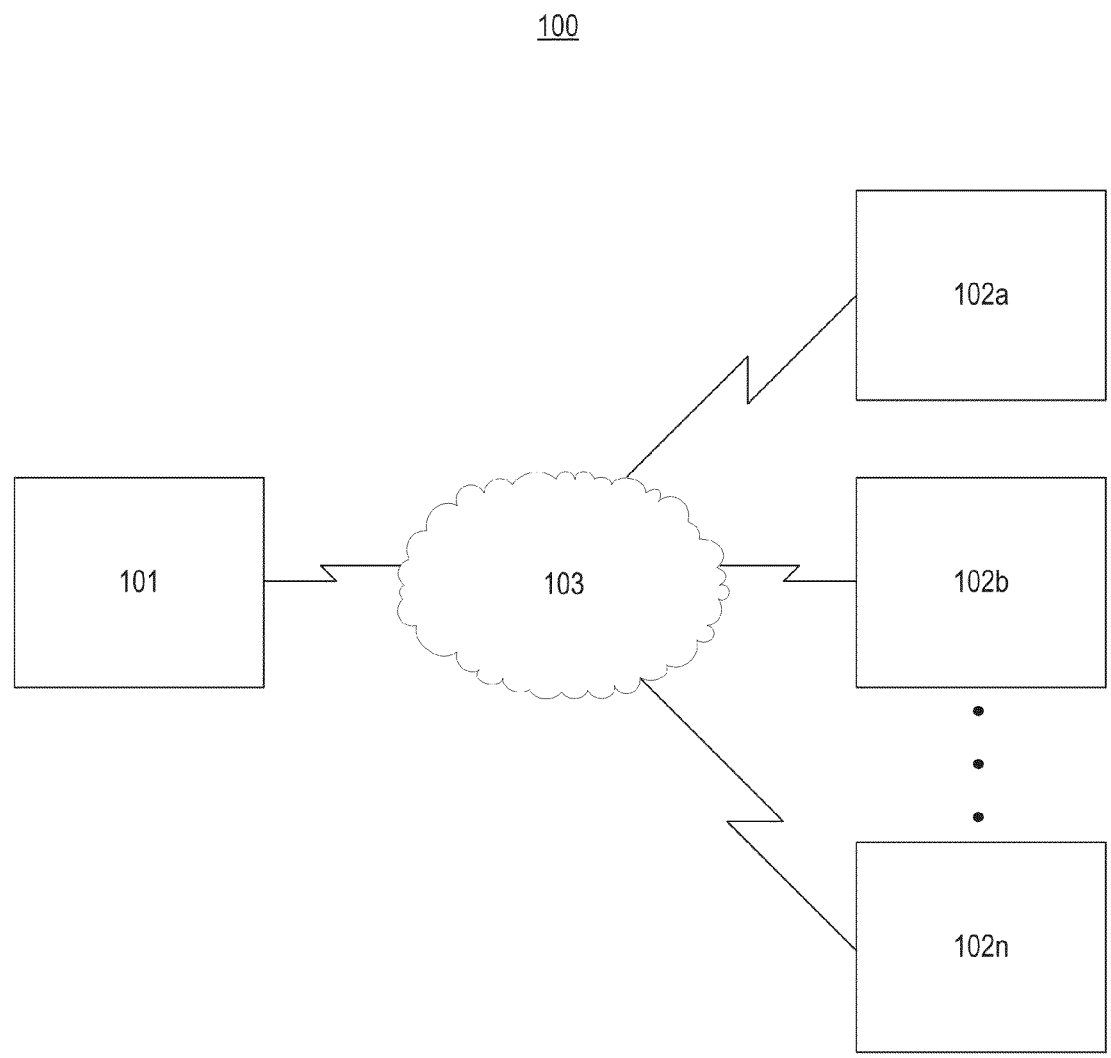
FIGS. 1 and 1A each illustrate an example computing environment in which the present invention can be implemented.

FIG. 1 illustrates an example computer environment 100 in which the present invention can be implemented. Computer environment 100 includes a server system 101 and a plurality of mobile devices 102a-102n that are interconnected by a network 103. Mobile devices 102a-102n will typically be mobile phones. However, any type of mobile device capable of communicating with another mobile device can be used in some implementations of the present invention. Network 103 can typically be the internet although any other type of network could also be used.

In a typical implementation, server system 101 functions as an intermediary between two or more of mobile devices 102a-102n. For example, if mobile device 102a sends a notification to mobile device 102b, server system 101 would receive the notification from mobile device 102a and route it to mobile device 102b. In other implementations, however, mobile devices 102a-102n could be configured to communicate notifications in a peer-to-peer manner without involving server system 101. Accordingly, FIG. 1 is intended to represent one example architecture within which the present invention may be implemented and should not be viewed as limiting the invention to any particular architecture.

Figure 1A:
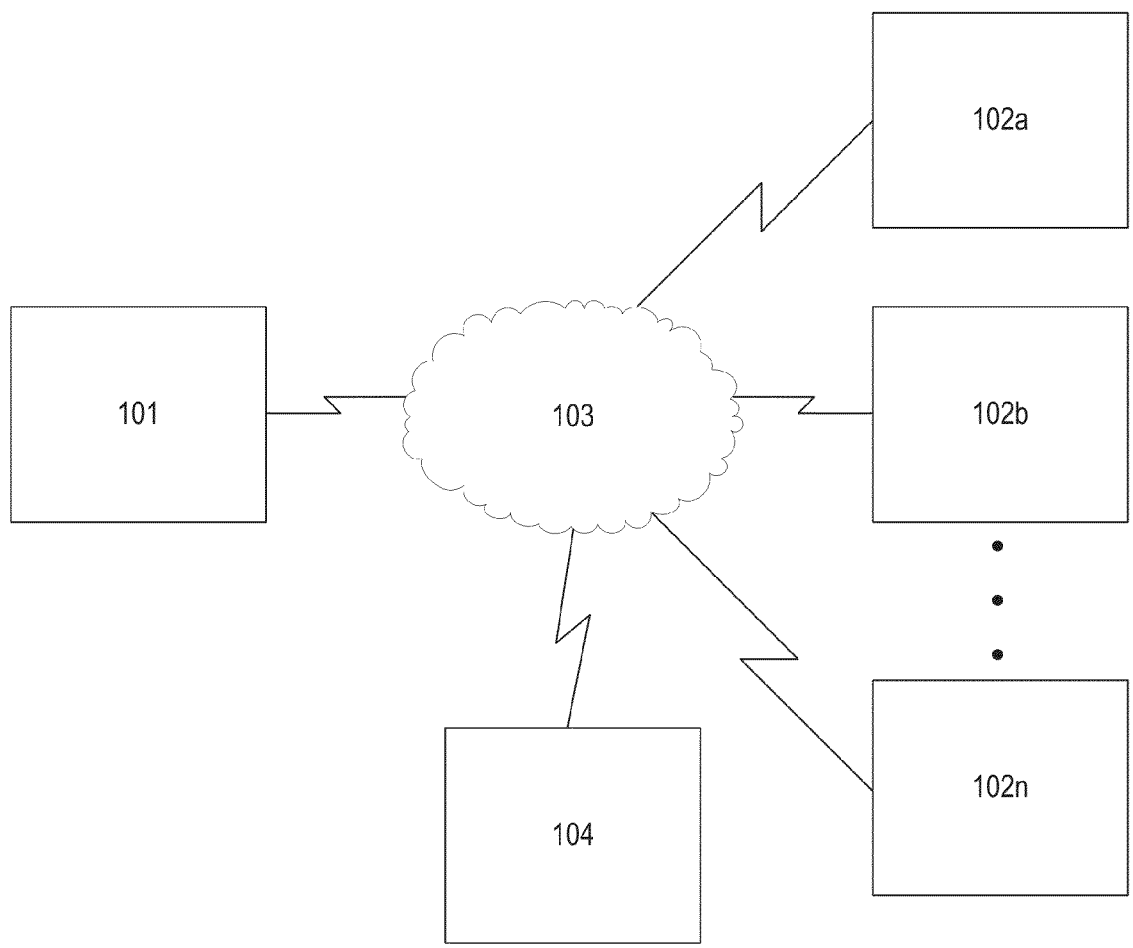

FIG. 1A illustrates another example computer environment 110 in which the present invention can be implemented. Computer environment 110 is similar to computer environment 100 except that it includes a computing device 104 which can communicate with one or more of mobile devices 102a-102n. For example, computing device 104 can represent a desktop or laptop computer. Computer environment 110 can therefore represent an implementation where the computing device that sends a notification/request (as further described below) is not a mobile device.

Figure 2A:
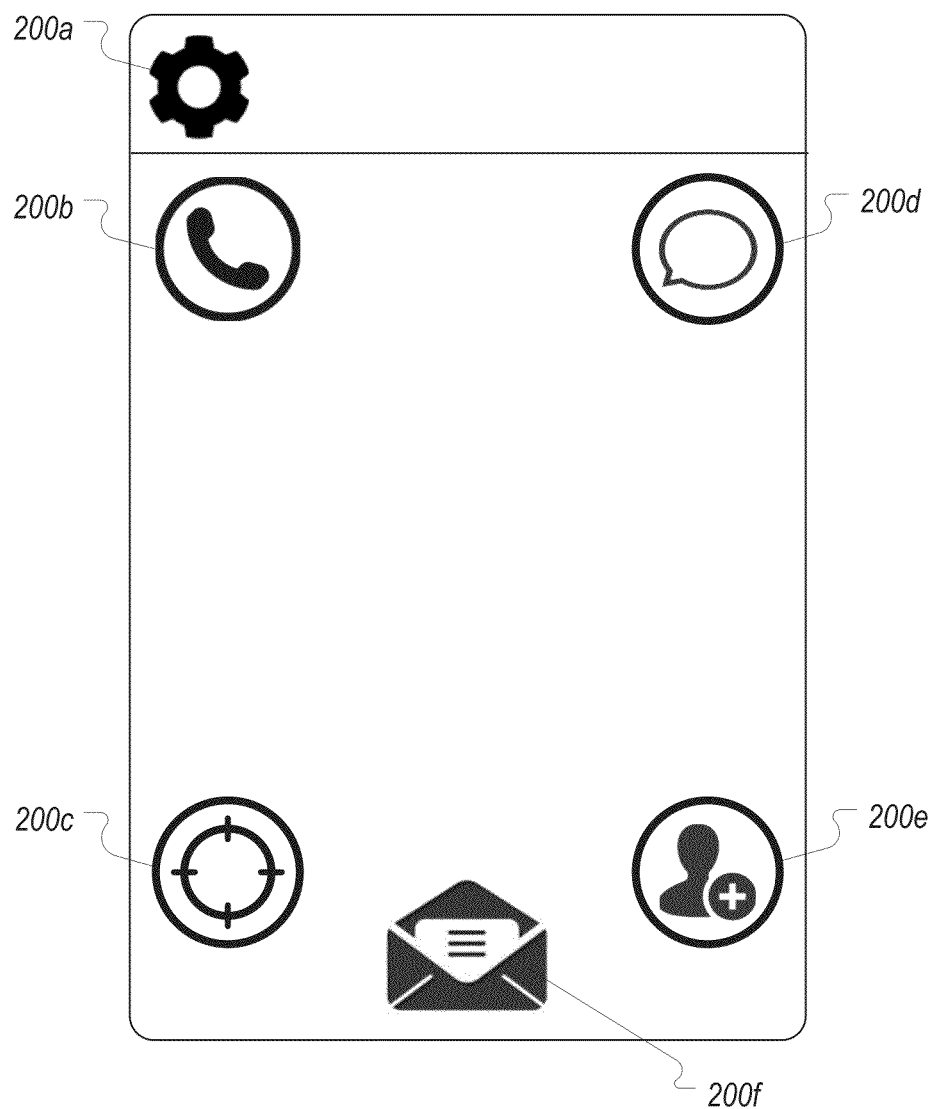
FIGS. 2A-2F illustrate various user interfaces that can be displayed in a mobile application in accordance with one or more embodiments of the present invention.

FIGS. 2A-2F illustrate various user interfaces of a mobile application that can be displayed on a mobile device to allow a user to configure and use the mobile device to implement various features of the present invention. FIG. 2A illustrates a main user interface 200 that includes a settings icon 200a, a phone call icon 200b, a remote map icon 200c, a message icon 200d, an add contact icon 200e, and a received messages icon 200f. Although FIGS. 2A-2F depict user interfaces of a mobile application, similar user interfaces can be displayed as part of a website or a desktop application (e.g., on computing device 104). In embodiments where the device on which the user interfaces are displayed does not include phone capabilities, phone call icon 200b may not be displayed or may otherwise be disabled.

Figure 2B:
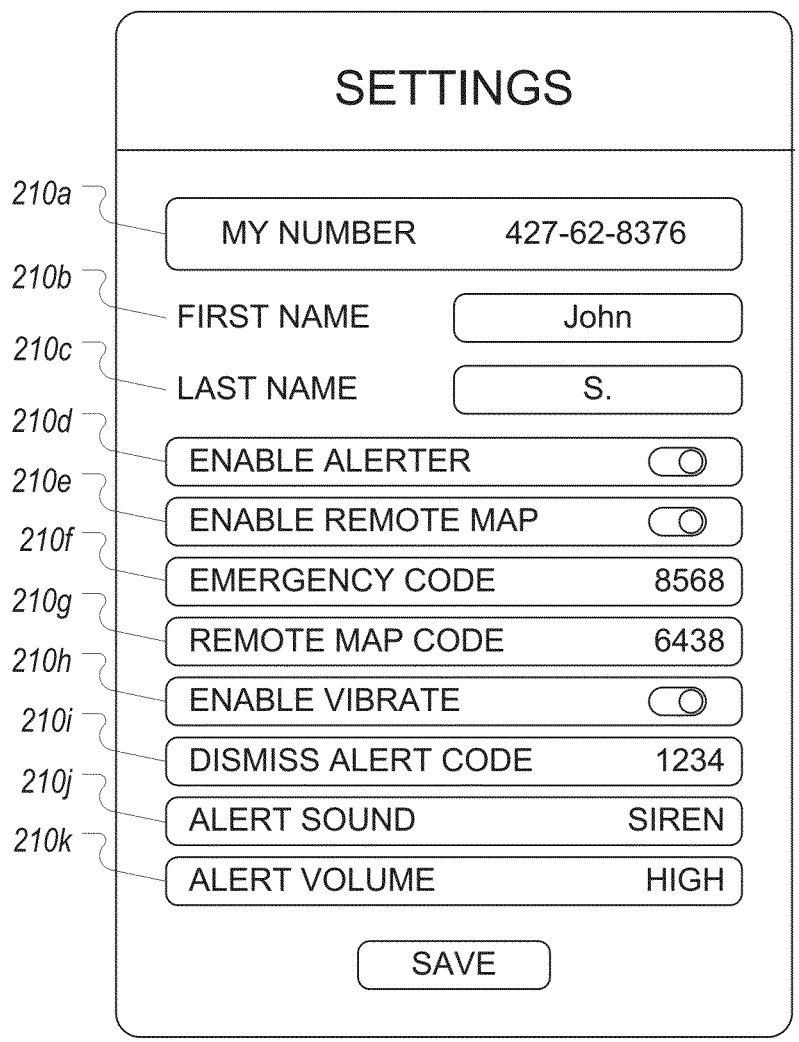

Settings icon 200a can be selected to view and update various settings of a user's account. When settings icon 200a is selected, a settings user interface 210, such as is shown in FIG. 2B, can be displayed. Settings user interface 210 includes various fields that define parameters associated with the user's account.

Some of the fields included in settings user interface 210 define parameters that are shared with other mobile devices to allow the other mobile devices to send alerts to the mobile device. These parameters include a unique identifier, an emergency code, and a remote map code.

The number field 210a defines the unique identifier for the mobile device, which in this example is 427-62-8376. The unique identifier can be used by other mobile devices to direct alerts to the mobile device. Although the unique identifier is shown as a number that is similar to a phone number, any type of unique identifier can be used. For example, a username or email address could be used as the unique identifier.

The emergency code field 210f stores an emergency code that can be used by other mobile devices when sending an alert to cause the mobile device's volume settings to be overridden when it receives the alert. The emergency code therefore acts as a secret key for overriding the volume settings. The remote map field 210g stores a remote map code that can be used by other mobile devices to retrieve the location of the mobile device. The use of these parameters to generate a phone call notification, a message notification, and a remote map request will be described below with reference to FIGS. 3A-3D, 4A-4D, and 5A-5C respectively.

The first name field 210b and the last name field 210c allow the user to associate his or her name with the account. The enable alerter field 210d and enable remote map field 210e allow the user to control other mobile devices' ability to override the volume settings and retrieve the mobile device's location respectively. The enable vibrate field 210h allows the user to control whether the mobile device will vibrate prior to outputting an audible alert when an alert is received.

The dismiss alert code field 210i defines a dismiss alert code that must be input by the user when an alert is received to cause the audible alert to cease being output. The alert sound field 210j and the alert volume field 210k allow the user to customize which sound is output and the volume at which it is output when an alert is received.

Figure 2C:
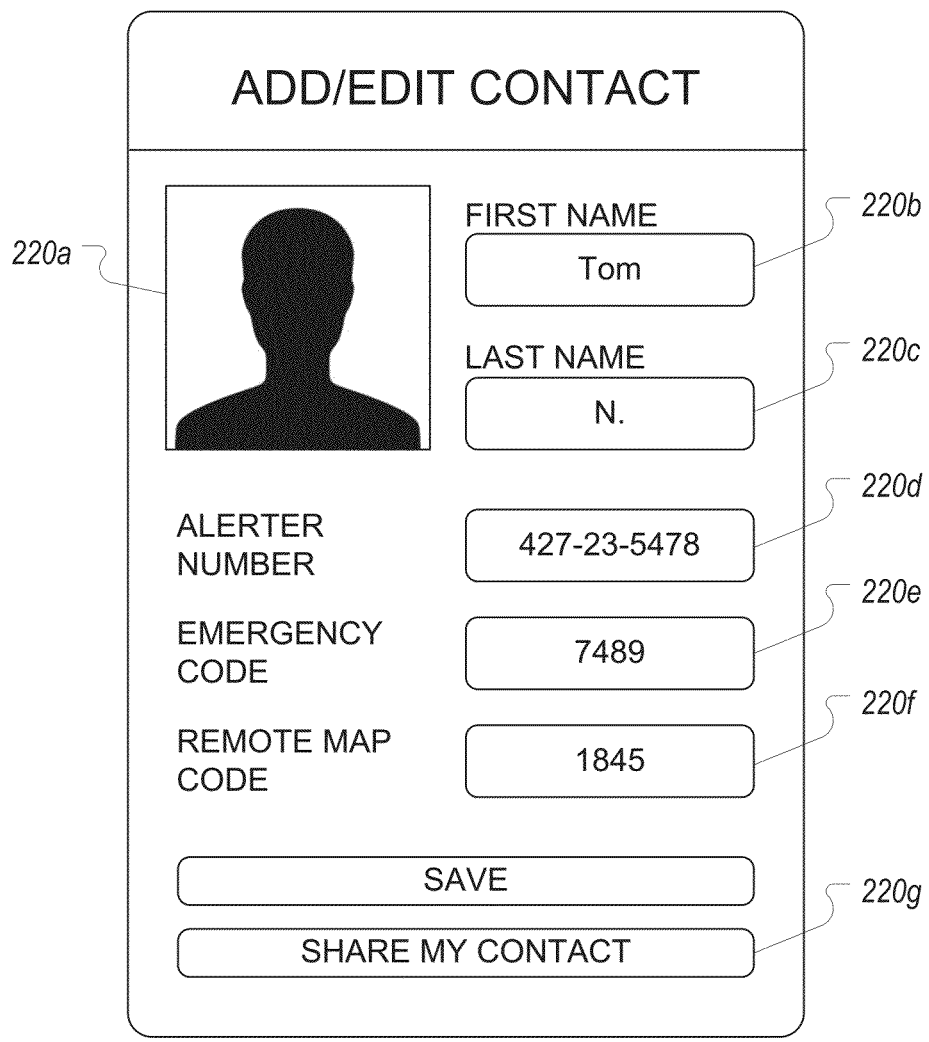

FIG. 2C illustrates a contact user interface 220 that can be displayed when add contact icon 200e is selected. Contact user interface 220 includes various fields for defining the information necessary to send a notification or request to another mobile device. These fields include a unique identifier field 220d which defines the contact's unique identifier, an emergency code field 220e which defines the contact's emergency code, and a remote map code field 220f which defines the contact's remote map code. Contact user interface 220 may also provide a picture field 220a for adding a picture of the contact and first and last name fields 220b, 220c for adding the contact's name. Each of these fields can be manually populated by the user once the user receives the information from the contact.

Contact user interface 220 also includes a Share My Contact button 220g which allows the user to share his or her contact information with the contact. For example, assuming the user's name, unique identifier, emergency code, and remote map code are John S., 427-62-8376, 8568, and 6438 respectively as shown in FIG. 2B, selecting the Share My Contact button 220g will cause this information to be sent to the contact's (Tom N.'s) mobile device. In this way, Tom N. can add a contact for John S. without having to manually enter John S.'s information.

Figure 2D:
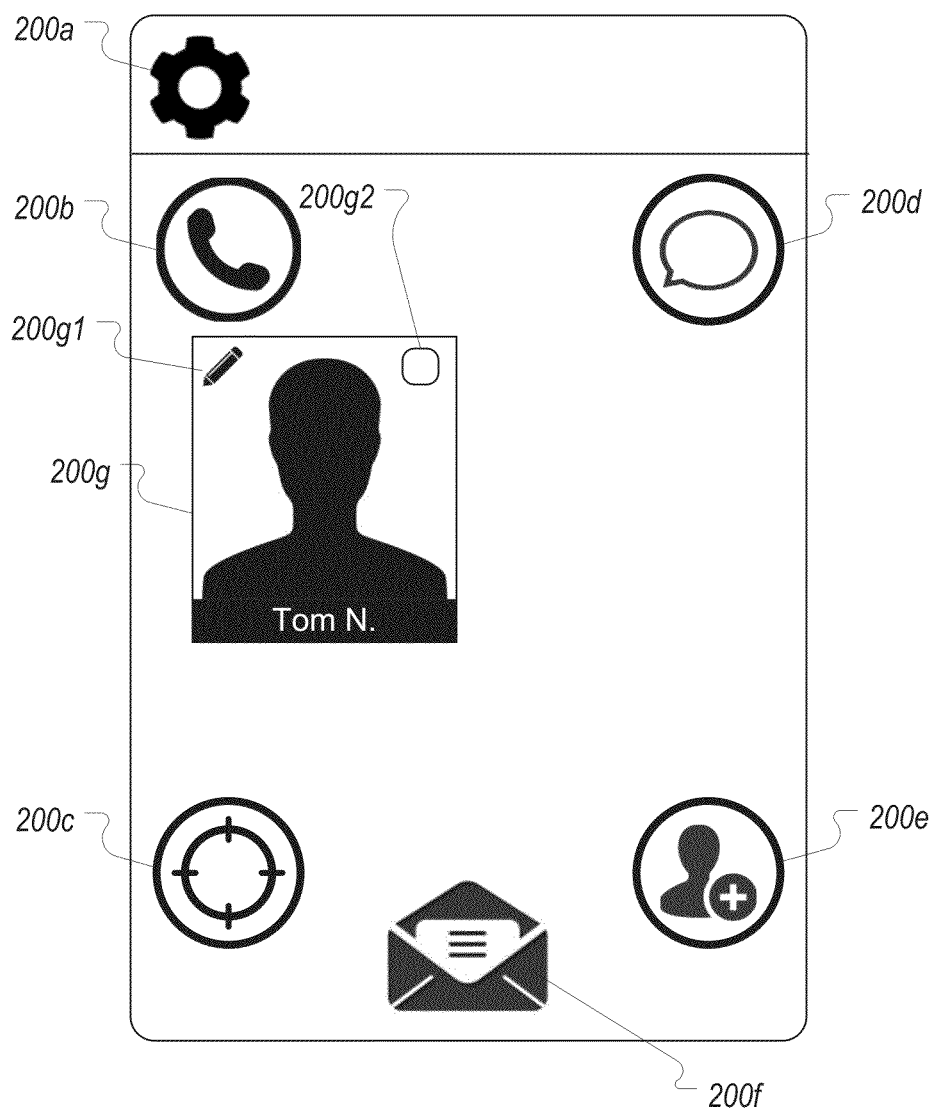

FIG. 2D illustrates main user interface 200 after a contact has been created for Tom N. As shown, a contact icon 200g for Tom N. has been added to main user interface 200. Contact icon 200g includes an edit icon 200g1 which can be selected to edit Tom N.'s information or to share the user's contact information with Tom N. (e.g., via contact user interface 220). Contact icon 200g also includes a select icon 200g2 which allows the contact to be selected as a recipient of a notification or remote map request as will be further described below.

Figure 2E:
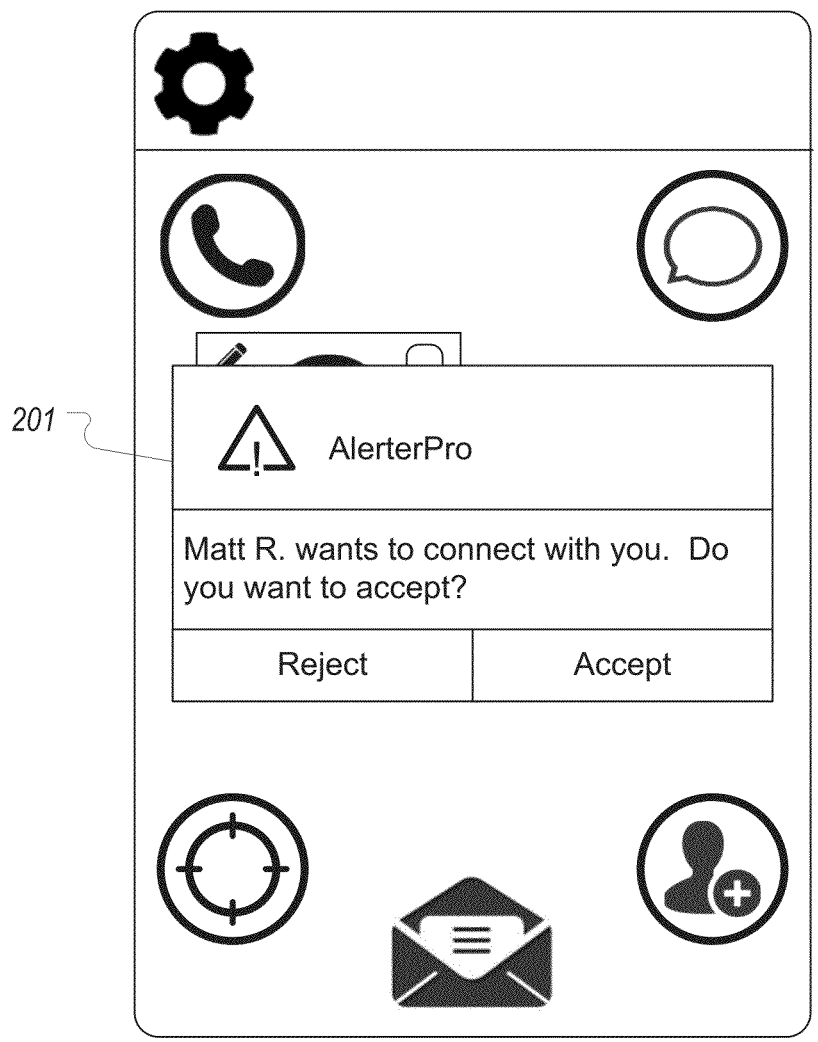

When contact information is shared (e.g., by selecting the Share My Contact button 220g), a notification can be displayed to allow the recipient of the shared information to accept or reject the contact. FIG. 2E illustrates an example of a notification 201 that can be displayed when a contact, which in this case is Matt R., has shared contact information. If the user selects Accept within notification 201, a contact for Matt R. can be automatically created including by populating fields 220a-220f with the received contact information.

Figure 2F:
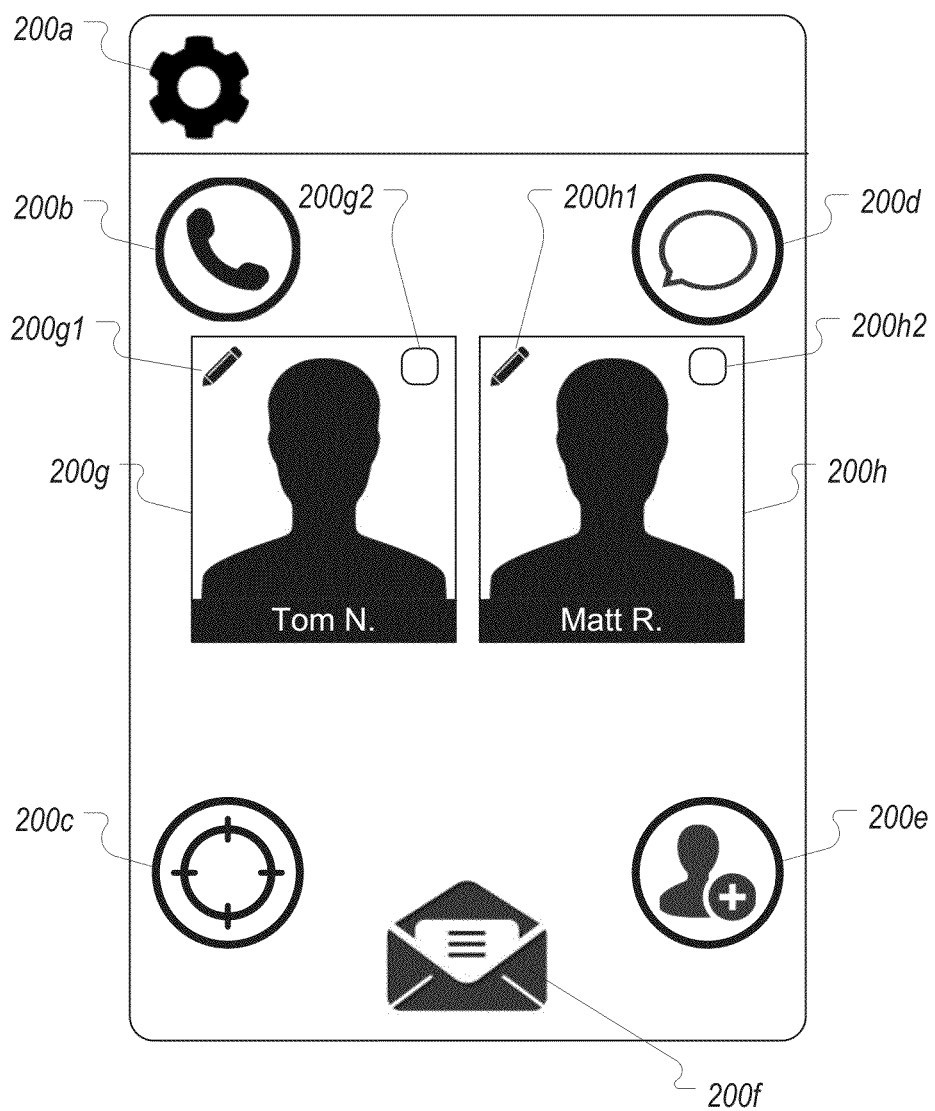

FIG. 2F illustrates main user interface 200 after the user has accepted Matt R.'s request to share contact information. As shown, a contact icon 200h has been added to main user interface 200 for Matt R. Contact icon 200h includes an edit icon 200h1 and a select icon 200h2 as described above.

Figure 3A:
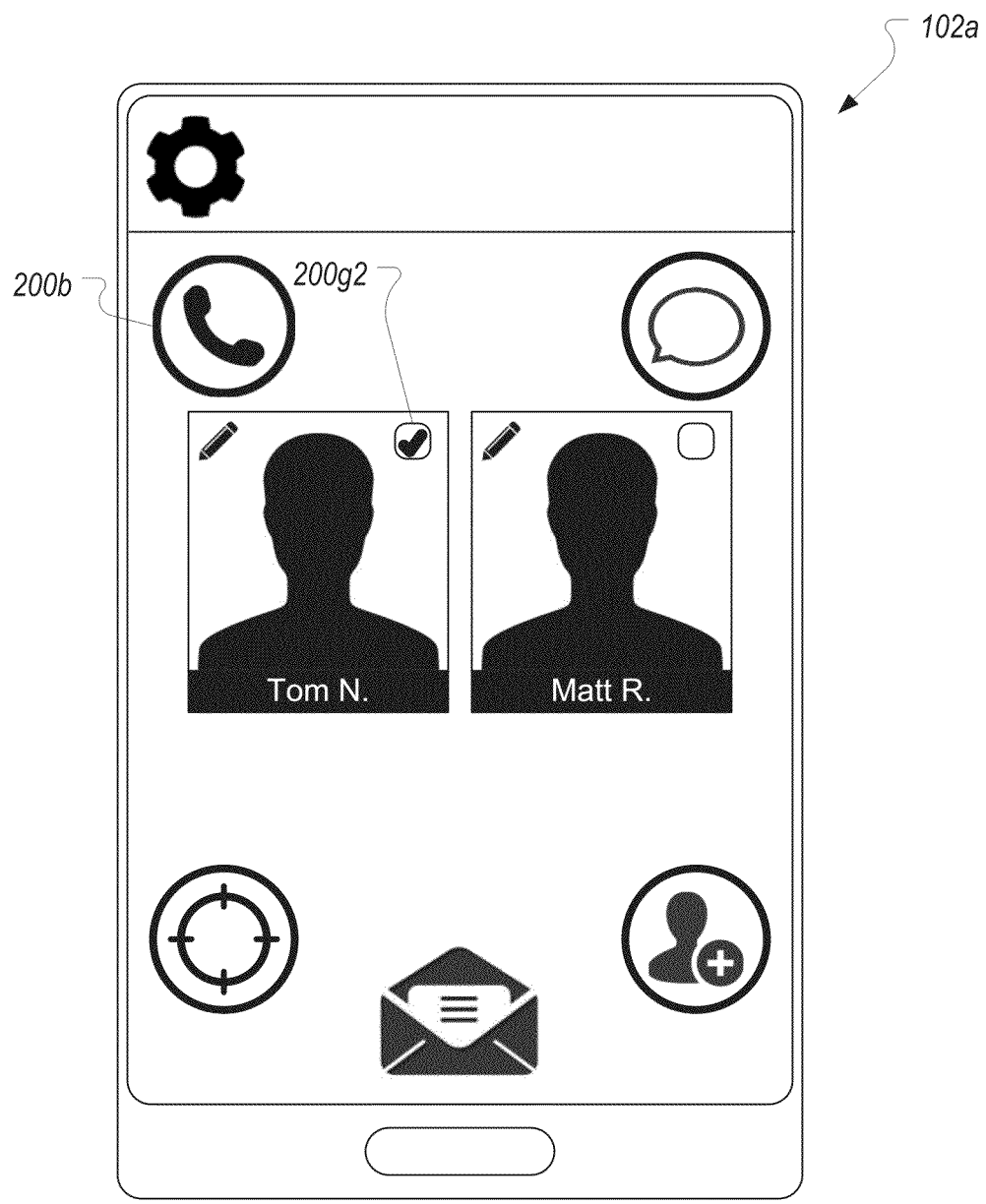
FIGS. 3A-3D illustrate a process for sending a phone call notification to another mobile device

FIGS. 3A-3D illustrate the process of sending a phone call notification which will cause the recipient mobile device's volume settings to be overridden so that an audible alert can be output to notify the user of the received notification. FIG. 3A illustrates that the sending device is mobile device 102a which will be assumed to be John S.'s device. Alternatively, the sending device can be computing device 104 (i.e., a non-mobile device). As shown, John S. has selected select icon 200g2 within Tom N's contact icon 200g. After selecting select icon 200g2, John S. then selects phone call icon 200b thereby causing a phone call notification to be sent to Tom N.'s mobile device 102b.

Figure 3B:
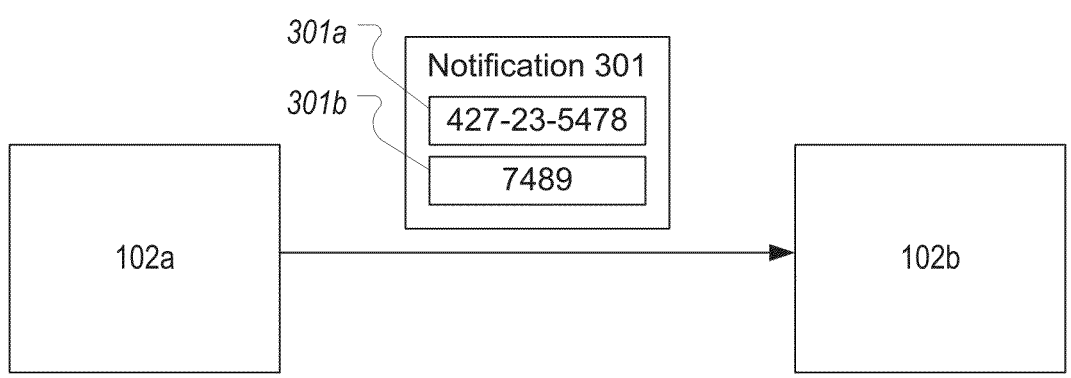

FIG. 3B illustrates an example of a phone call notification 301 that can be sent by John S.'s mobile device 102a to Tom N.'s mobile device 102b. Phone call notification 301 includes Tom N.'s unique identifier 301a and emergency code 301b, which in this example are 427-23-5478 and 7489 as shown in FIG. 2C. Unique identifier 301a is used to route phone call notification 301 to mobile device 102b. Although not shown, phone call notification 301 may be sent by mobile device 102a to server system 101 which would then route the notification to mobile device 102b based on unique identifier 301a.

Upon receiving phone call notification 301, mobile device 102b will verify that emergency code 301b matches the emergency code for the mobile device (e.g., the emergency code specified in emergency code field 210f in the mobile application executing on mobile device 102b). If phone call notification 301 includes the proper emergency code, the mobile application executing on mobile device 102b will cause the volume settings of the mobile device to be set to the specified volume level (e.g., to the value specified in alert volume field 210k). In this case, since notification 301 is a phone call notification, both the notification and ringer volume can be adjusted (assuming mobile device 102b provides separate controls for each volume). Once the volume settings have been overridden, an audible alert can be output (e.g., the sound specified in alert sound field 210*j*). In this manner, even if the volume settings on mobile device 102*b* were muted when notification 301 was received, by the time the alert sound is output, the volume will have been turned on so that Tom N. will be immediately notified.

Figure 3C:
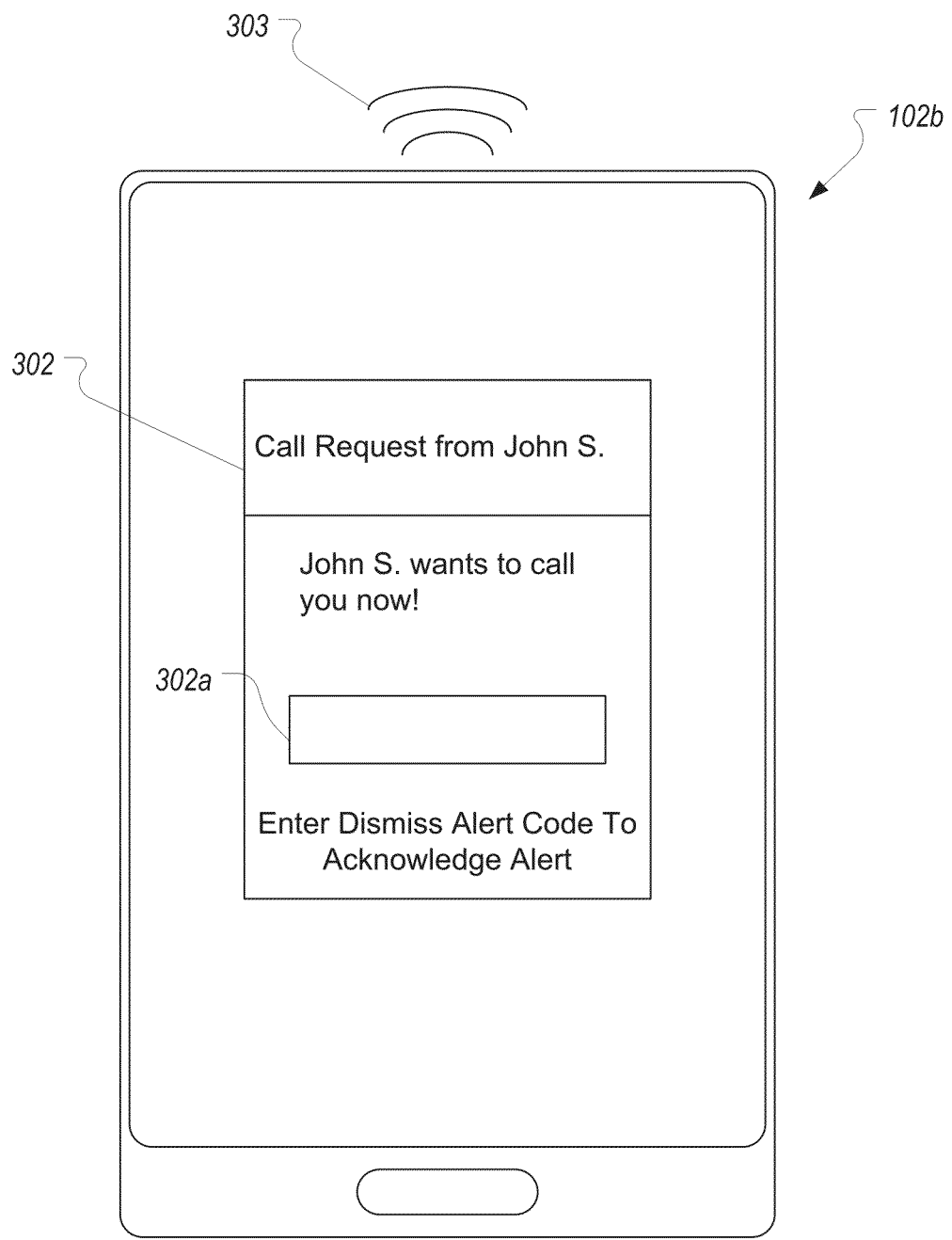

FIG. 3C illustrates an example alert 302 that can be displayed on mobile device 102*b* when notification 301 is received. As indicated by 303, the receipt of notification 301 has caused an audible alert to be output even though the notification volume setting of mobile device 102*b* had been set to silent. Alert 302 specifies that the alert is a call request from John S. and indicates that John S. would like to immediately call Tom N. Alert 302 also includes a field 302*a* in which the dismiss alert code (e.g., the dismiss alert code specified in dismiss alert code field 210*i*) can be input to acknowledge alert 302. Although the dismiss alert code is shown as a number, other types of user input could also serve as the dismiss alert code (e.g., a pattern, biometric input, voice input, etc.).

Once the dismiss alert code is input, the audible alert can be turned off. In some embodiments, such as when enable vibrate field 210*h* has been turned on, mobile device 102*b* can initially vibrate when alert 302 is displayed and prior to the audible alert being output so that the user can acknowledge the alert before the audible sound is output.

Figure 3D:
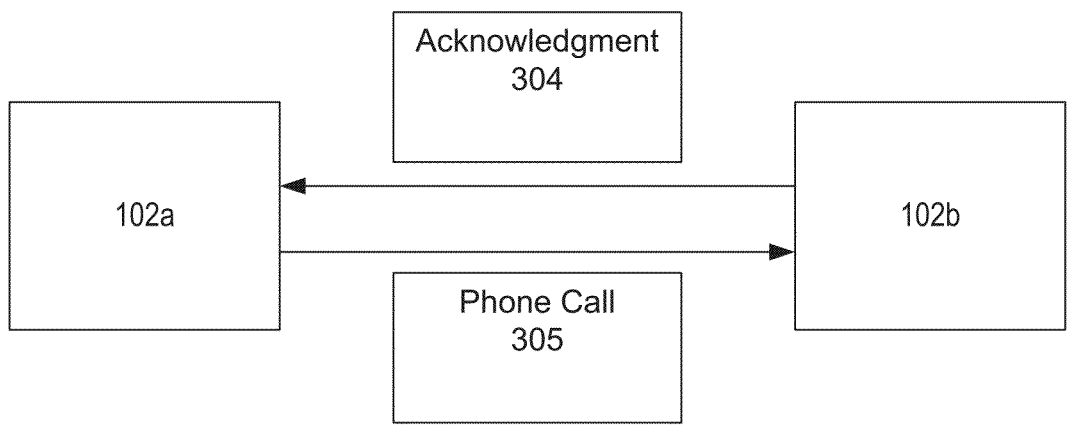

In addition to causing the audible alert to be turned off, the input of the dismiss alert code also causes an acknowledgement 304 to be sent back to mobile device 102*a* as shown in FIG. 3D. Acknowledgement 304 informs mobile device 102*a* that Tom N. has acknowledged the receipt of notification 301. Upon receiving acknowledgement 304, the mobile application executing on mobile device 102*a* causes a phone call 305 to be made to mobile device 102*b*. In embodiments where the sending device is not a mobile phone (e.g., if mobile device 102*a* were replaced with computing device 104 in the above described process), upon receiving acknowledgement 304, computing device 104 can display an indication of the acknowledgement to inform a user of computing device 104 that a phone call can be made to mobile device 102*b*. The user of computing device 104 (or another person) can then manually place the call.

Accordingly, by selecting phone call notification icon 200*b*, John S. can send a notification to cause Tom N.'s phone to output an audible alert even when Tom N.'s phone's sound is turned off, and can cause a phone call to be automatically made to Tom N.'s phone once Tom N. has acknowledged the alert (or at least be notified when a phone call can be manually made). In this manner, the present invention increases the likelihood that John S. will be able to immediately communicate with Tom N. in case of an emergency or urgent matter.

FIGS. 4A-4D illustrate the process of sending a message notification which will cause the receiving mobile device's volume settings to be overridden so that an audible alert can be output to notify the user of the received notification. The process of sending a message notification is similar to the process of sending a phone call notification except that a phone call is not initiated when the message notification is acknowledged. Although the process of sending a message notification will be described with mobile device 102 being the sending device, similar processing can occur when computing device 104 is the sending device.

Figure 4A:
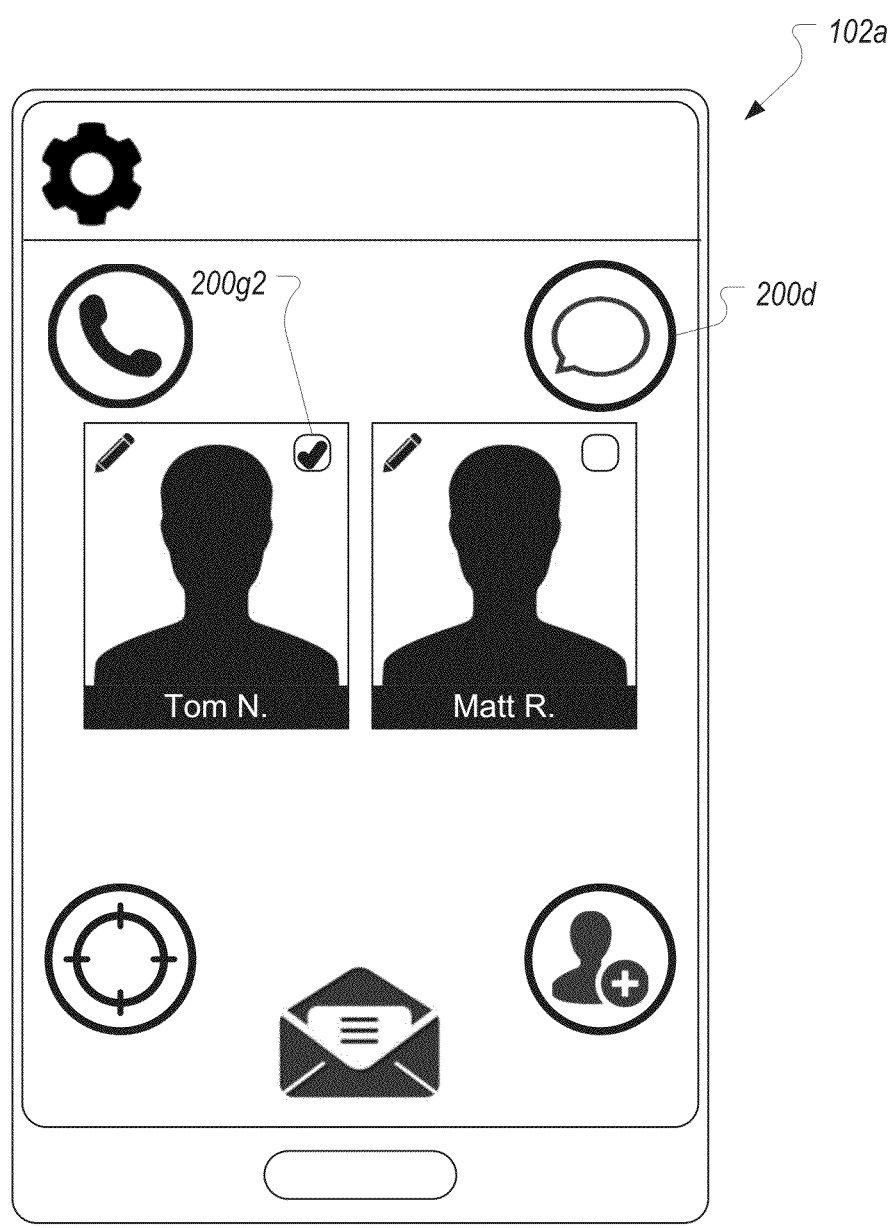
FIGS. 4A-4D illustrate a process for sending a message notification to another mobile device.

FIG. 4A illustrates that John S. has again selected Tom N. as indicated by the check in select icon 200*g*2. However, this time John S. selects message icon 200*d* to request that a message notification be sent. Although not shown, when message icon 200*d* is selected, a prompt can be displayed to allow John S. to input a message.

Figure 4B:
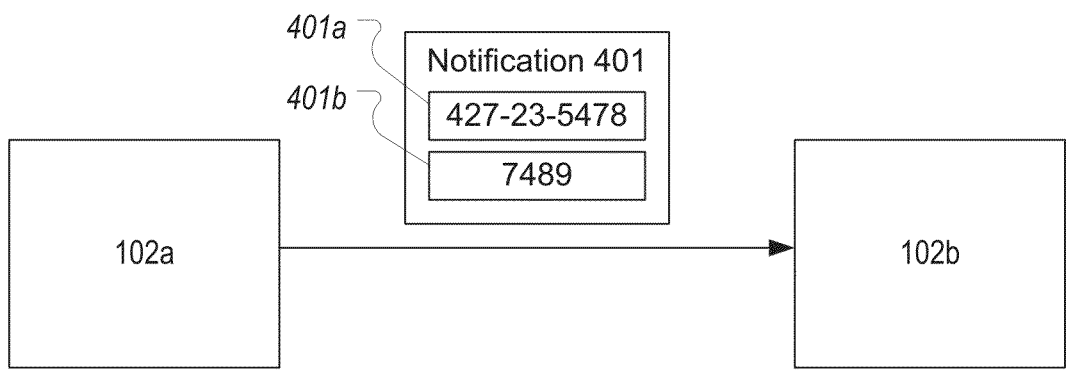

Once the content of the message has been input, mobile device 102*a* sends message notification 401 to mobile device 102*b* as shown in FIG. 4B. Message notification 401 includes unique identifier 401*a*, emergency code 401*b*, and the message content.

Figure 4C:
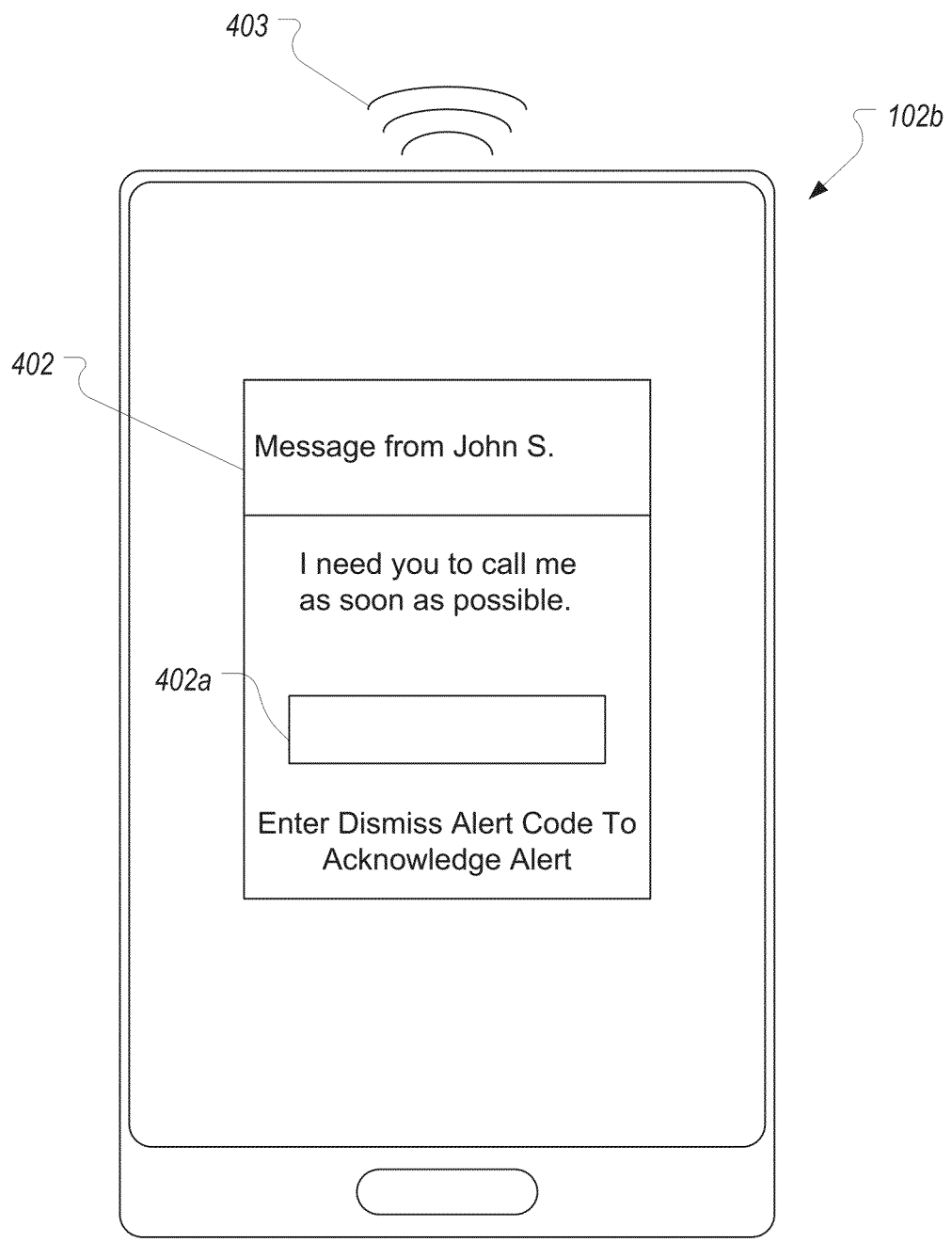

Upon receiving notification 401 and verifying that emergency code 401*b* is the proper emergency code, mobile device 102*b* overrides the current volume settings as described above so that an audible alert can be output as indicated by 403 in FIG. 4C. Alert 402 is also displayed to indicate that the message notification is from John S. and to present the content of the message.

Figure 4D:
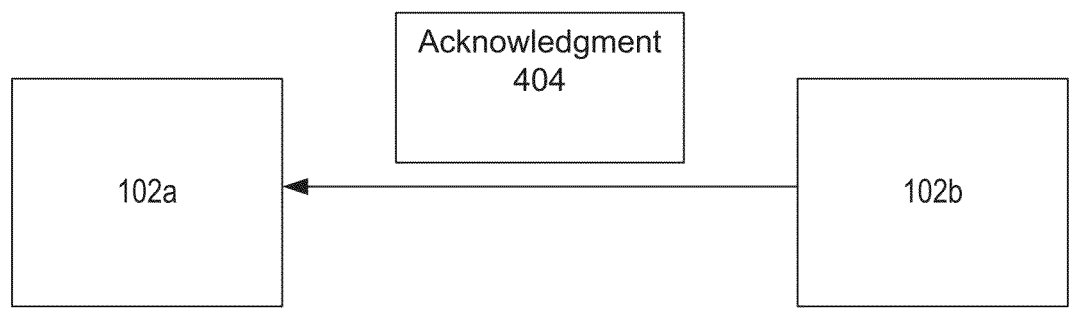

Alert 402 includes a field 402*a* in which the dismiss alert code can be input to acknowledge the alert and cause the audible alert to be turned off. Once alert 402 has been acknowledged, an acknowledgement 404 is sent back to mobile device 102*a* as shown in FIG. 4D. In some embodiments, mobile device 102*a* can display an indication that acknowledgement 404 was received to inform John S. that Tom N. viewed the message. Mobile device 102*b* can store received messages which can then be accessed via received messages icon 200*f*.

Overriding a volume setting, turning on the volume, etc. can refer to any action which allows an alert to be audibly output even though the corresponding volume setting was previously set to silent (or possibly set to a lower level). This action can include a temporary change in the volume setting that pertains only to the alert or can include a permanent change so that the volume setting remains at the adjusted level even after the alert is output. Also, different types of devices provide different options for controlling the volume of the device. In some embodiments, only the volume setting or settings applicable to the notification is adjusted. For example, if the mobile device provides separate controls for notification and ringer volume, and the received notification is a message notification, only the notification volume may be adjusted.

Figure 5A:
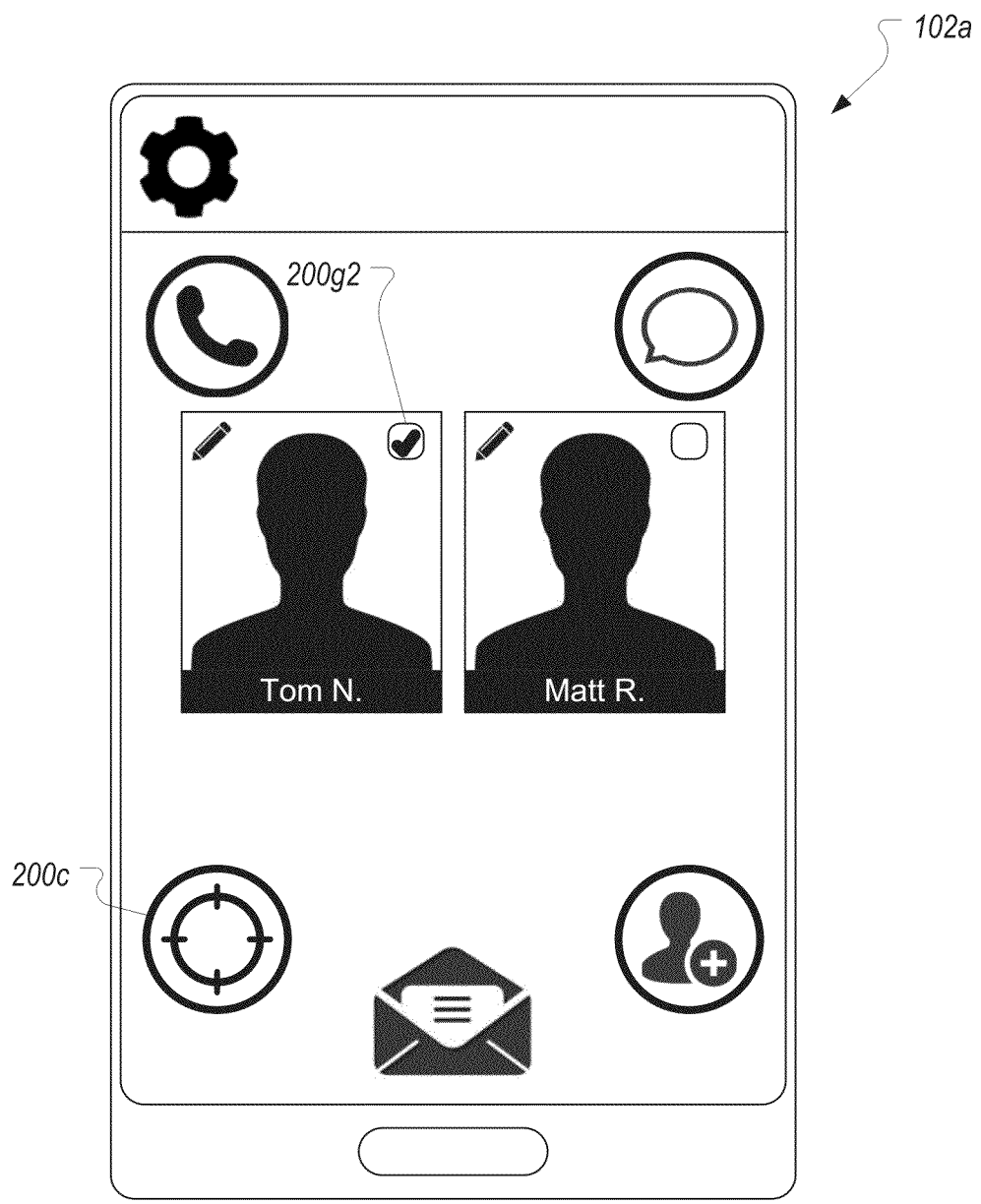
FIGS. 5A-5C illustrate a process for sending a remote map request to another device.
Figure 5B:
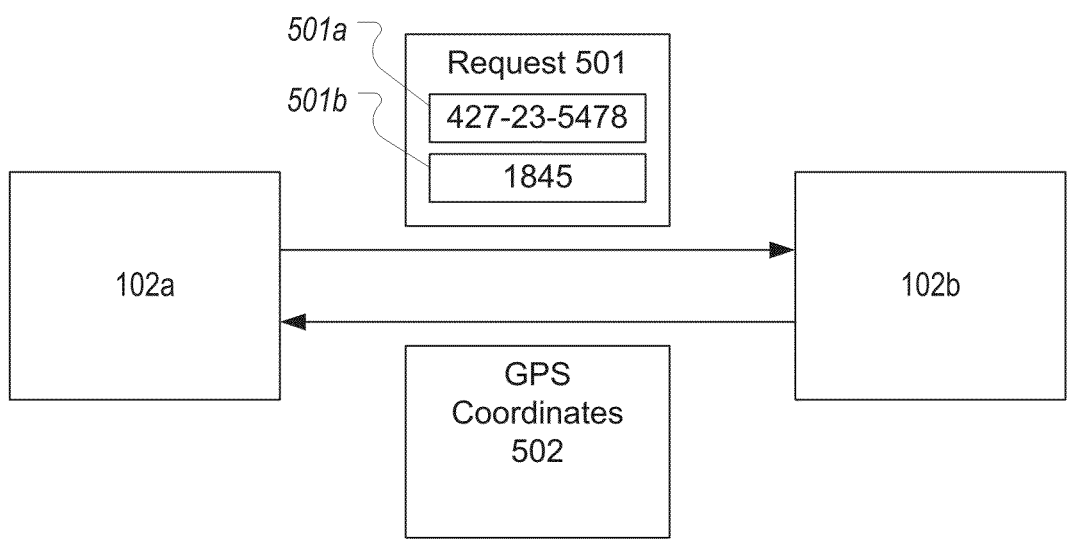
Figure 5C:
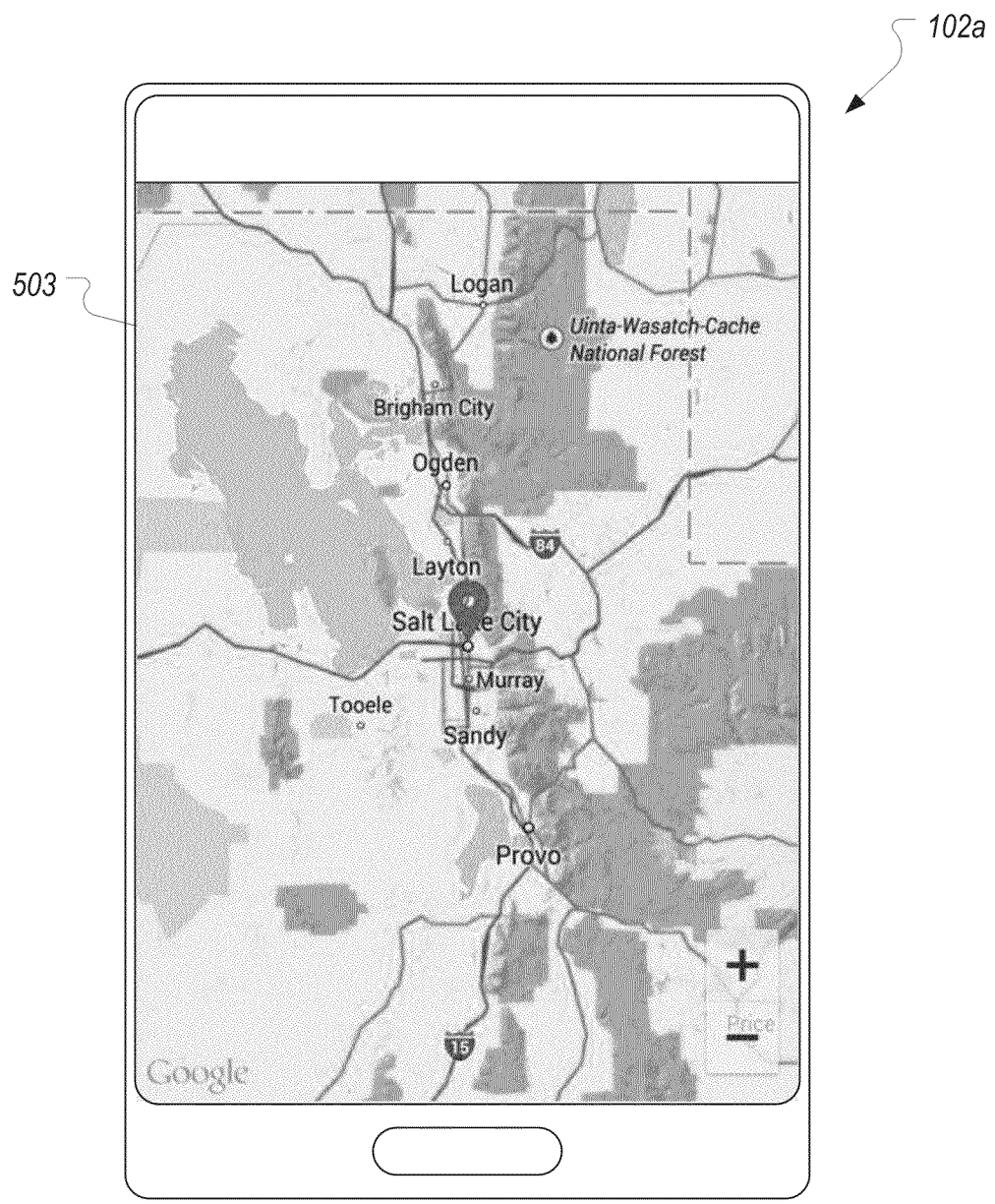

FIGS. 5A-5C illustrate the process of sending a remote map request. Although the process of sending a remote map request will be described with mobile device 102*a* being the sending device, similar processing can be performed when computing device 104 is the sending device. FIG. 5A illustrates that John S. has selected select icon 200*g*2 in Tom N.'s contact icon 200*g* and has also selected remote map icon 200*c*. In response, mobile device 102*a* sends a remote map request 501 to mobile device 102*b* as shown in FIG. 5B. Remote map request 501 includes unique identifier 501*a* and remote map code 501*b* (e.g., the remote map code specified in remote map code field 220*f*).

Upon receiving remote map request 501, the mobile application executing on mobile device 102*b* verifies whether remote map code 501*b* matches the remote map code for mobile device 102*b* (e.g., that it matches Tom N.'s remote map code). If remote map code 501*b* is the proper value, mobile device 102*b* returns information identifying the location of mobile device 102*b* such as GPS coordinates 502.

When mobile device 102*a* receives GPS coordinates 502, mobile device 102*a* displays a map 503 with an indication of the location of mobile device 102*b* as shown in FIG. 5C. In this manner, any user that knows the unique identifier and remote map code of another user can quickly identify the location of the other user (or at least the location of the other user's mobile device).

In some embodiments, various functionality of a mobile device can be disabled until a user acknowledges a received notification. For example, upon receiving notification 301 or 401, mobile device 102b can become "locked" until Tom N. inputs the dismiss alert code. The ability to disable a phone until a notification is acknowledged can serve as a form of parental controls.

In some embodiments, a single notification can include both an emergency code and a remote map code. In such instances, the sending mobile device can immediately be notified of the location of the receiving mobile device even if the user of the receiving mobile device does not immediately acknowledge the notification.

Figure 6A:
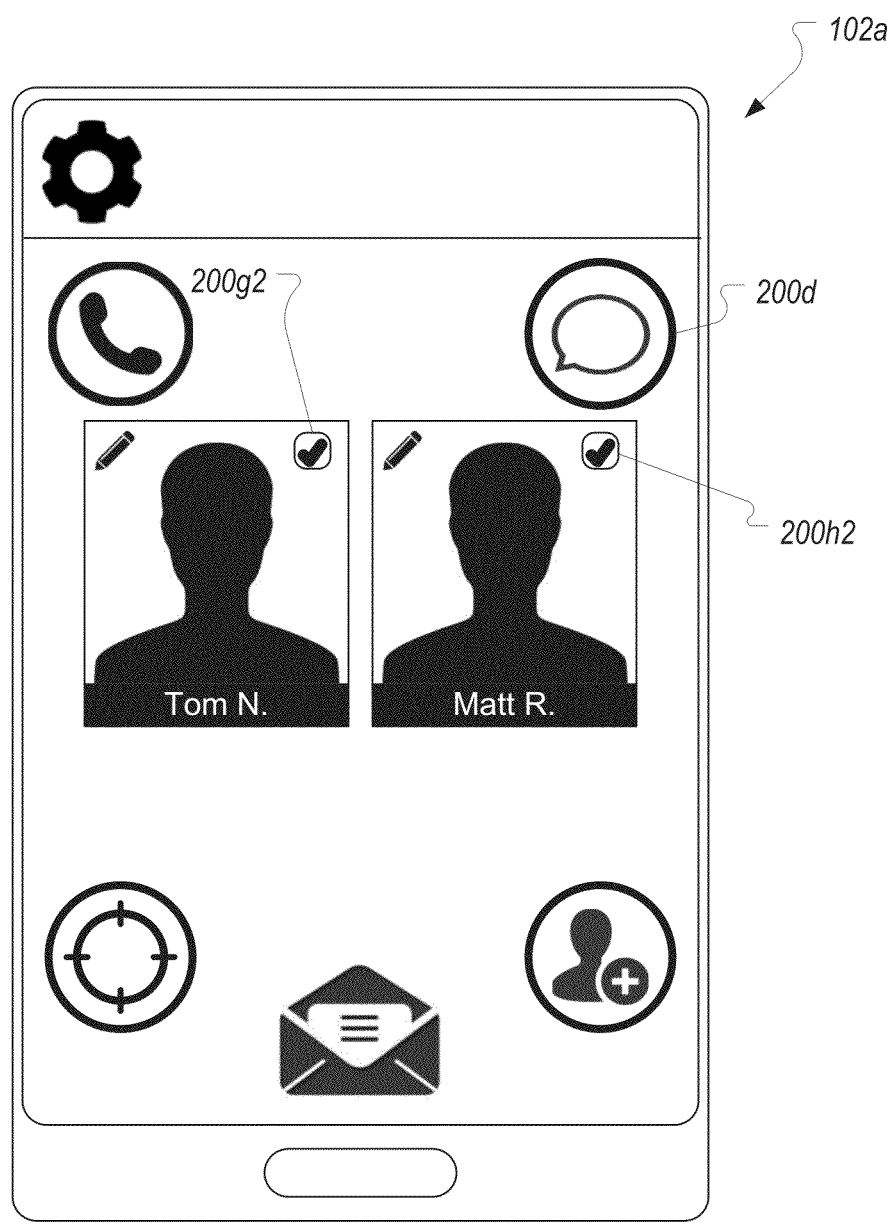
FIGS. 6A-6C illustrate a process of sending a group notification/request.
Figure 6B:
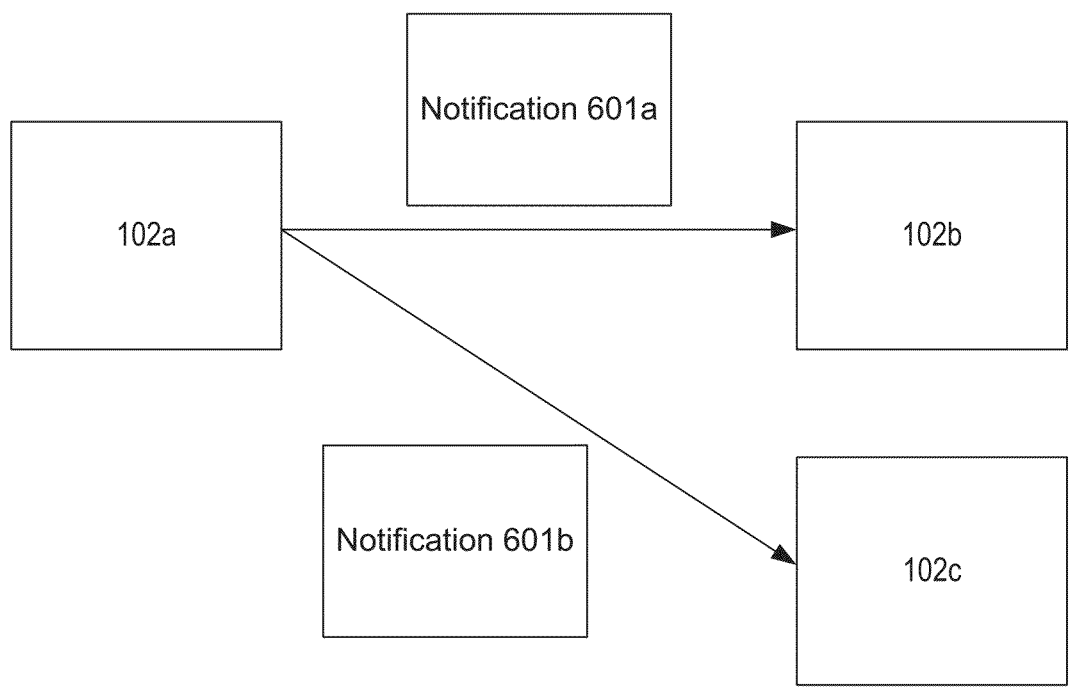
Figure 6C:
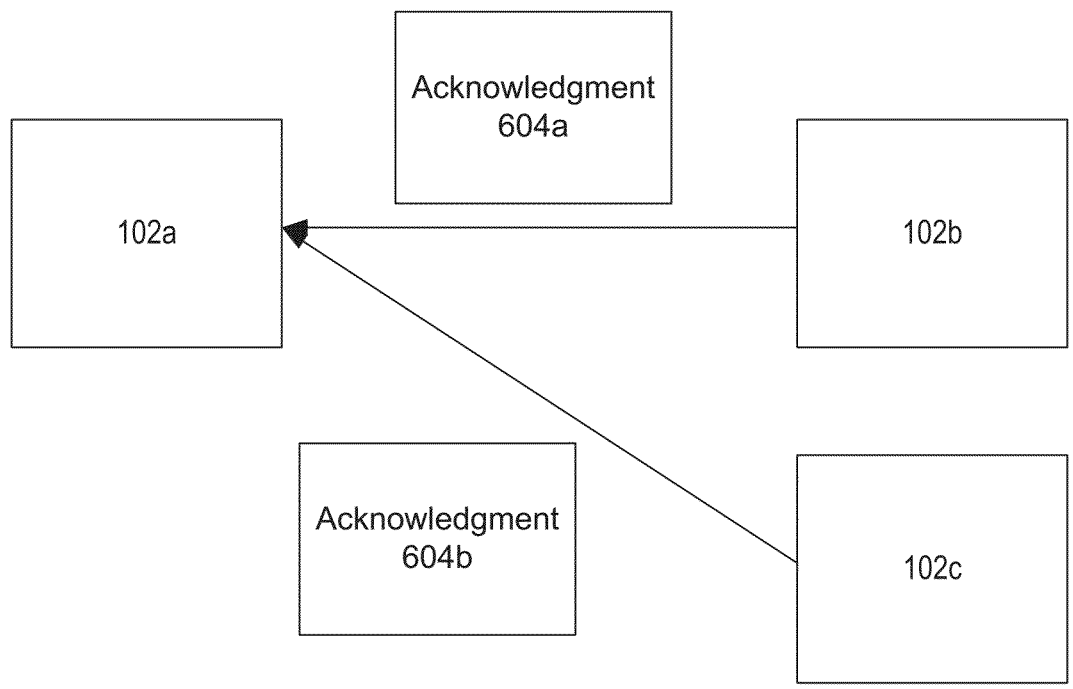

In some embodiments, a notification/request can be sent to a group of mobile devices. FIGS. 6A-6C depict an example process of sending a group notification and/or request. FIG. 6A illustrates an interface similar to the interface in FIG. 4A. However, unlike in FIG. 4A, both select icons 200g2 and 200h2 have been selected. Because more than one contact has been selected, any notification/request that is requested will be sent as a group notification/request. For example, if John S. selects message icon 200d, message notifications 601a and 601b will be sent to mobile devices 102b and 102c respectively as shown in FIG. 6B. The sending of notifications 601a and 601b can be performed in the manner described above (i.e., by sending a notification to each user using the user's unique identifier and emergency code and/or remote map code). However, any content of a message input by John S. will be included in both notifications 601a and 601b. Similar processing can be performed if John S. requests a phone call notification or a remote map request with the corresponding notification or request being sent to each selected user. In this way, John S. can easily send a notification/request to multiple users without requiring separate requests for each user.

In some embodiments when a group notification/request is sent, the sending device (e.g., mobile device 102a) can be configured to display a summary of the responses received from the devices that received the group notification/request. For example, as shown in FIG. 6C, each of mobile devices 102b and 102c can respond to the received notification by sending notifications 604a and 604b respectively in a similar manner as described above. Mobile device 102a can then display an indication of the received responses.

For example, if the group notification/request is sent with both the emergency code and the remote map code, mobile device 102a can display a map populated with indications of the locations of each user that has responded. The display of the indications can be customized to indicate which mobile devices have acknowledged the notification. For example, if a user sends a group notification to a group of ten members, the location of each of the ten members can be identified on a map once the locations are received back from the corresponding ten devices. Each location can initially be identified using, for example, a red indicator. Then, as acknowledgements are received, the corresponding indicators can be turned green to represent which users have acknowledged the alert. In this way, the sender can easily track the location and responsiveness of each member in the group.

Figure 7A:
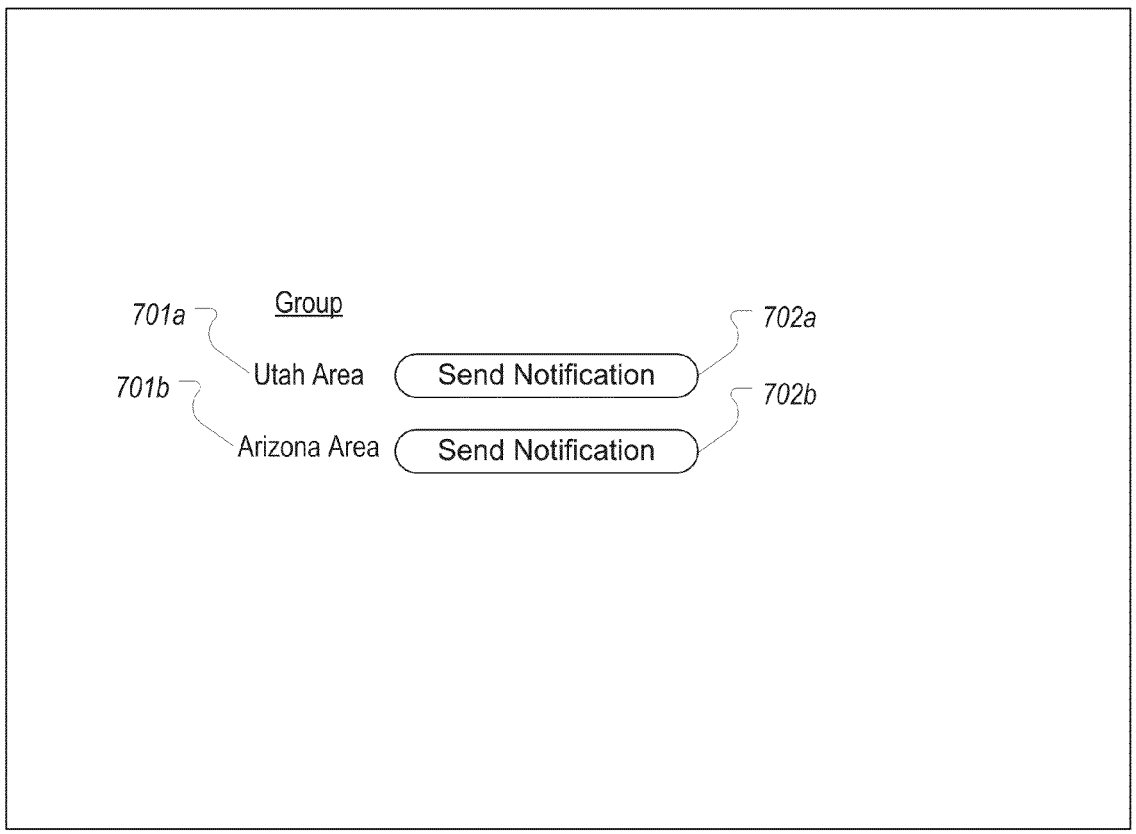
FIGS. 7A and 7B illustrate another process of sending a group notification/request.

The example shown in FIG. 6A represents a scenario where the group notification/request is based on a user's selection of multiple recipients. However, in other embodiments, a group may be separately defined and maintained to facilitate the sending of notifications/requests to the defined group. For example, FIG. 7A illustrates a web-based interface 700 which lists a Utah Area group 701a and an Arizona Area group 701b. Alongside each group, a button 702a, 702b is provided for requesting that a notification be sent to each member that belongs to the corresponding group. Any number of users may belong to each of groups 701a, 701b. Interface 700 can be displayed on computing device 104 or any other web-enabled device (including any of mobile devices 102a-102n).

In some embodiments, each mobile device 102a-102n can include an option (e.g., within settings interface 210) to join a group. For example, each group may define a group identifier and a password which can be entered into a mobile device to cause the mobile device (or user of the mobile device) to be added to the group. When a user is added to a group, the user's unique identifier, emergency code, and remote map code can be stored in association with the group to allow notifications/requests to be sent to the user when group notification/request are requested to be sent to members of the group.

In some embodiments, groups may be arranged hierarchically. In this way, a group notification/request sent to a first group in the hierarchy will also include any groups that are positioned under the first group in the hierarchy. This hierarchical structure can be beneficial for companies or organizations that may want to communicate quickly with many of its members.

Figure 7B:
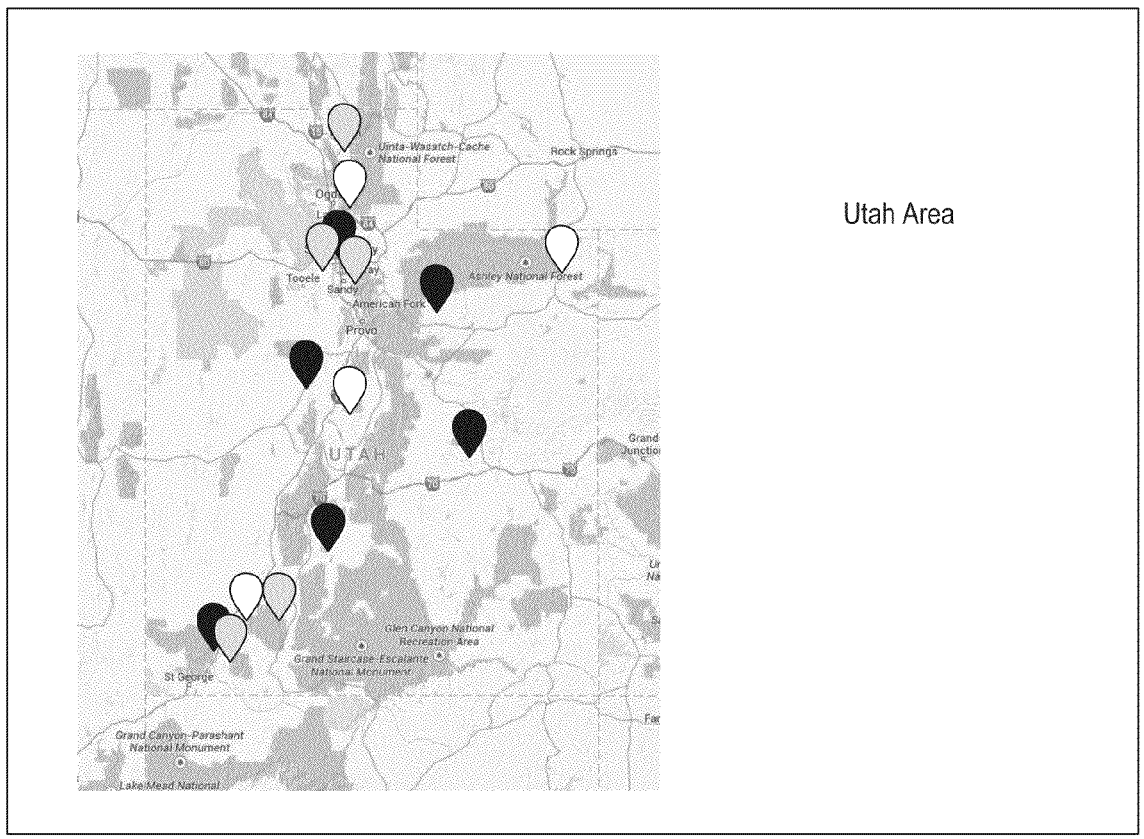

As described above, when a group notification/request is sent, the sending device can be configured to display an indication of the responses received from members of the group. FIG. 7B illustrates an example interface 710 that can be displayed when a group notification is sent that includes both the emergency code and remote map code.

As shown in FIG. 7B, a map of the relevant area, which in this case is Utah, has been displayed. Also, an indication for each member in the group to which the notification was sent has also been displayed. In this example, each indication is either black, gray, or white to represent that each indication can identify a state of each user to which the notification was sent. For example, white may represent that the user has acknowledged the notification, gray may represent that the user has not acknowledged the notification, and black may represent that the user has acknowledged the notification but has also provided additional information such as, for example, that the user is in need.

Figure 8A:
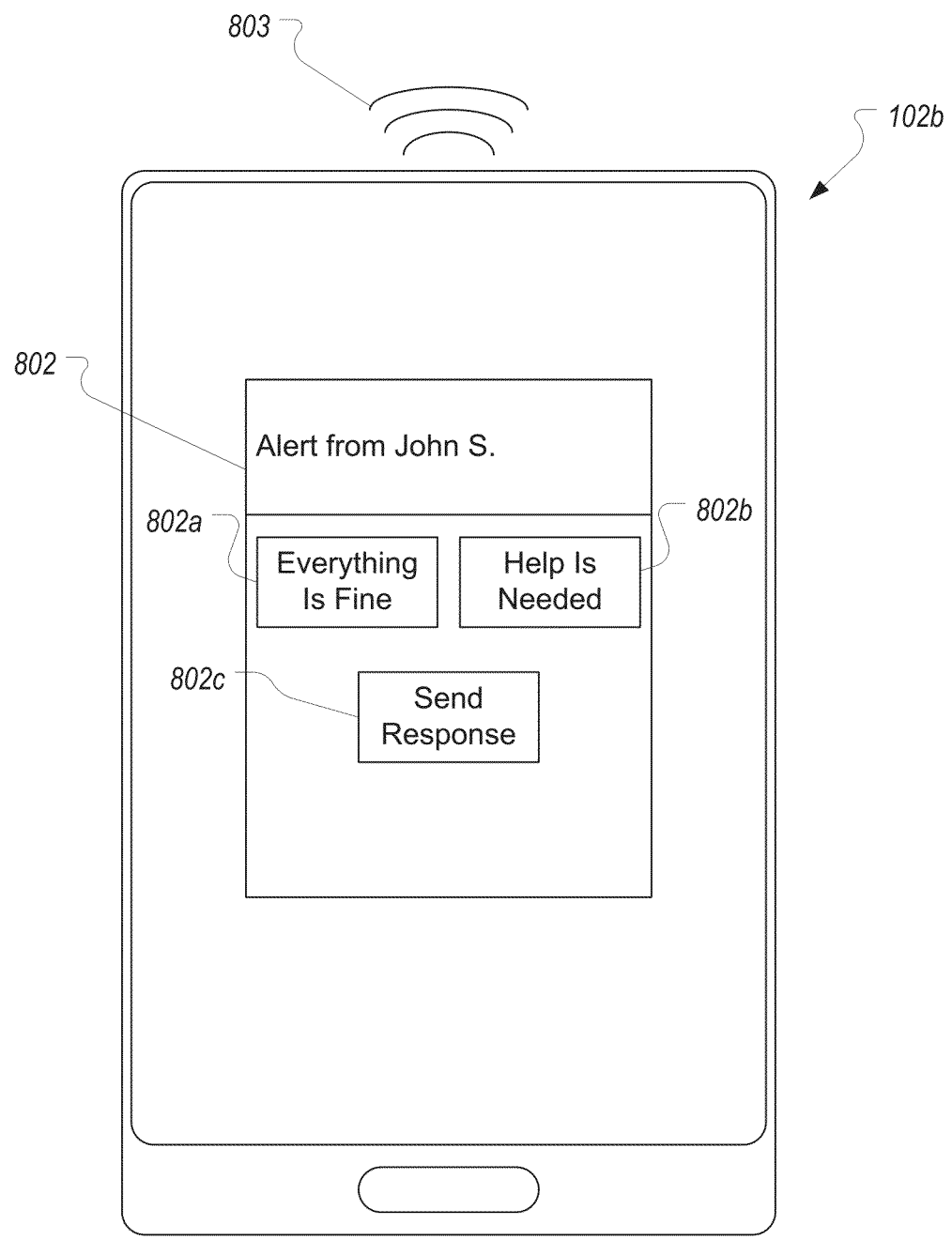
FIGS. 8A and 8B illustrate example user interfaces that can be employed to respond to a notification.
Figure 8B:
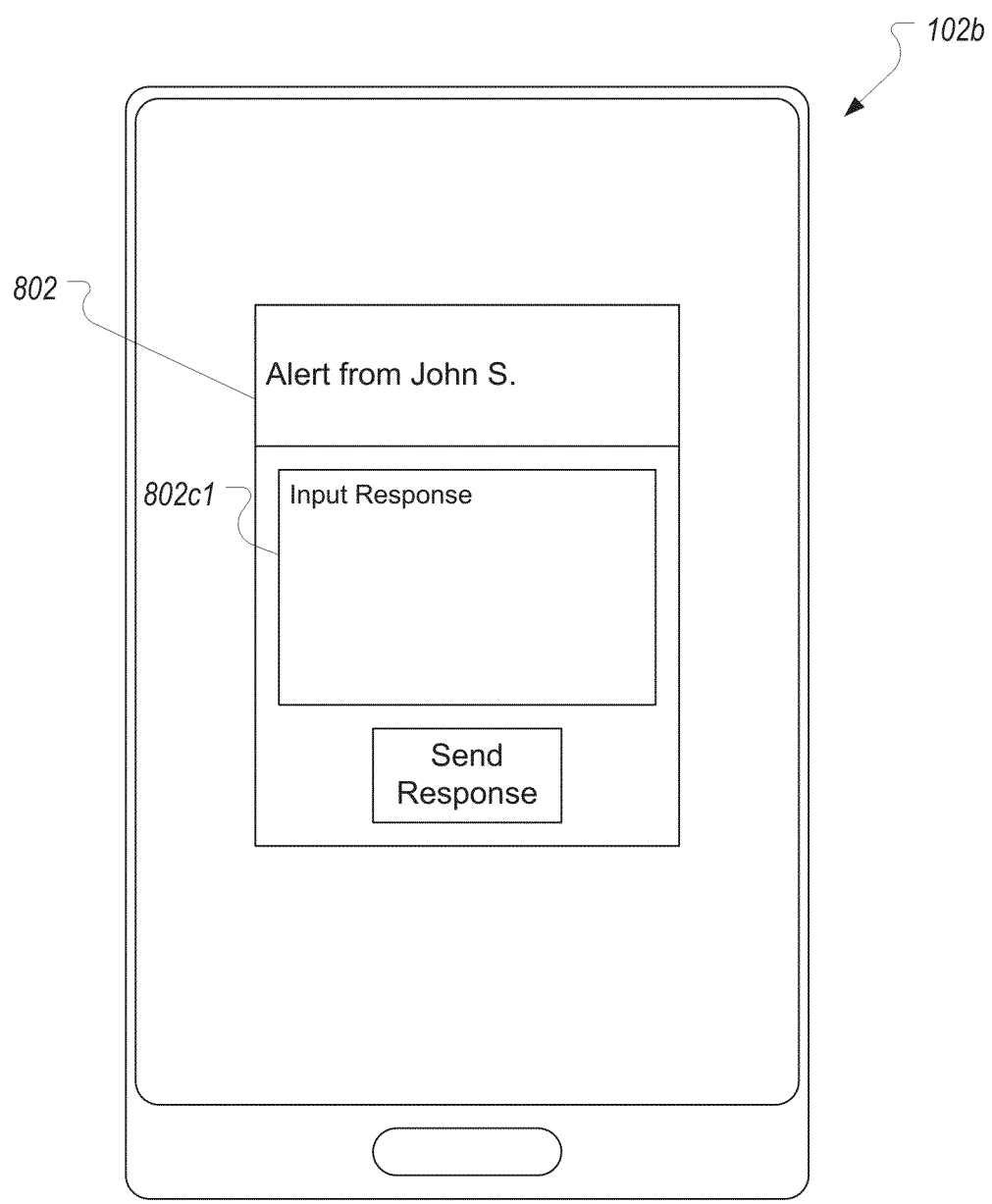

FIG. 8A illustrates another example alert 802 that can be displayed on a mobile device that receives a notification to facilitate receiving additional information about the user of the device. Alert 802 is similar to alerts 302, 402 except that various options 802a-802c are provided to allow the user of mobile device 102b to customize a response to the alert. As shown, a button 802a labeled "Everything Is Fine" can be selected to respond to the alert with an indication that the user of mobile device 102b does not need assistance. A button 802b labeled "Help Is Needed" can be selected to respond to the alert with an indication that assistance is needed. A button 802c labeled "Send Response" can be selected to input a custom response. When button 802c is selected, a text input field 802c1 can be displayed as shown in FIG. 8B to allow the user to input the custom response.

An indicator can be displayed on a map, such as the map shown in FIG. 7B, with a color that corresponds to which button (802a, 802b, or 802c) was selected by the user of the receiving device. For example, a green indicator can be displayed when the receiving user selects button 802a, a red indicator can be displayed when the receiving user selects 802b, a yellow indicator can be displayed when the receiving user selects button 802c, and a blue indicator can be displayed when the receiving user has not yet responded. Distinguishing among the different types of responses can also be performed even when no remote map request is involved. For example, each user to which a notification was sent could be listed in an interface using a coloring or other type of scheme to distinguish among the types of responses received.

In some embodiments where a group notification is sent, the receiving devices can first compare their current location to a defined area to determine whether to respond (e.g., by sending GPS coordinates of their current location). If a receiving device is not within the defined area, it may not send its location back to the sending device. Such embodiments may be useful when the group is a group of students of a school or university, employees of a company, etc. For example, while students are located on campus, it may be beneficial for an administrator to locate each student on campus in the case of an emergency (e.g., when a shooter is on the campus). However, if the student is not located on the campus, the student may prefer not to allow the administrator to find out where the student is located. The same is true of an employee that is not located at work. By verifying whether the receiving device is within a defined area prior to sending any acknowledgment/location, the receiving user's privacy can be maintained.

In some embodiments, mobile devices 102a-102n can be configured to periodically report their location to server system 101. Then, if a remote map request is sent to a mobile device which does not respond, server system 101 can provide the mobile device's last reported location in response to the remote map request. In this way, even though the current location of the receiving device cannot be identified with certainty, the sending user can still receive some guidance as to the receiving device's possible location. This feature may be beneficial in various scenarios such as, for example, with children or other individuals that may be kidnapped or when a phone is stolen. If the kidnapper happened to turn of the receiving device, the last reported location (or locations) could then prove beneficial in tracking the potential location of the child.

Although the description above refers to an emergency code, it is to be understood that the above described techniques can be implemented to send notifications/requests even in situations that would not be considered emergencies. The present invention therefore extends to all uses of the above described functionality regardless of the particular situation in which it is used.

In some embodiments, a user's stored contacts can be synchronized to server system 101. This can facilitate transferring contacts to another device (e.g., when a user purchases a new device). The user's unique identifier (e.g., username, email address, or other identifier) can be used in such cases to organize and identify such contacts when stored on server system 101.

Although the above described processes involve one device sending the unique identifier, emergency code, and/or remote map code to another device, the described process should also include embodiments where server system 101 performs intermediary processing on the unique identifier, emergency code, and/or remote map code. For example, server system 101 may verify the emergency code and/or remote map code prior to sending a notification/request to the receiving device. In such cases, the emergency code and/or remote map code may not be included in the notification/request sent by server system 101 to the receiving device. Instead, the fact that the notification/request is received from server system 101 may be sufficient to cause the receiving device to override its volume settings to output an audible alert and perform the other functionality described above.

Accordingly, the present invention should extend to embodiments where the emergency code and/or remote map code that is included by the sending device does not necessarily match the information that is ultimately sent by server system 101 to the receiving device as long as the information sent by server system 101 serves the function of indicating that the receiving device's volume settings should be overridden for the purpose of immediately notifying the user of an alert from the sending device.

The above-described techniques of the present invention can be employed in many different situations in addition to the situations described above. For example, a doctor's answering service can employ the present invention to alert a doctor of an emergency and to identify the doctor's current location to determine how long it will take the doctor to reach a hospital or other facility. Similarly, a dispatcher or fire chief can employ the present invention to alert volunteer firefighters of a fire and to identify their location. As mentioned above, the present invention can be employed by a university, a company, or an organization to track the location of its students, employees, or members when an emergency occurs. In short, the present invention can be used in any situation where it is desirable to immediately alert, notify, locate, and/or communicate with an individual or group of individuals.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. One or more non-transitory computer storage media storing computer executable instructions which when executed on a first computing device and a second mobile device implement a method for causing the second mobile device's volume settings to be overridden in response to receiving a notification from the first computing device thereby allowing an alert to be audibly output to notify a user of the received notification, the method comprising:

storing, on the first computing device, a unique identifier and an emergency code associated with the second mobile device;

receiving, at the first computing device, a user request to send a notification to the second mobile device;

transmitting the notification to the second mobile device, the notification including the unique identifier, the emergency code associated with the second mobile device, and a remote map code;

receiving the notification at the second mobile device;

comparing, by the second mobile device, the emergency code included in the notification to an emergency code stored on the second mobile device;

upon determining that the emergency code included in the notification matches the emergency code stored on the second mobile device, adjusting a volume setting on the second mobile device so that an alert that is generated in response to receiving the notification will be audibly output to immediately notify a user of the second mobile device that the notification was received;

comparing, by the second mobile device, the remote map code included in the notification to a remote map code stored on the second mobile device; and upon determining that the remote map code included in the notification matches the remote map code stored on the second mobile device, sending, to the first mobile device, information identifying a location of the second mobile device.

2. The computer storage media of claim 1, wherein adjusting the volume setting comprises changing the volume setting from a silent setting to a specified volume level.

3. The computer storage media of claim 1, wherein adjusting the volume setting comprises changing the volume setting from a lower volume setting to a higher volume setting.

4. The computer storage media of claim 1, further comprising:
displaying the alert on a display of the second mobile device.

5. The computer storage media of claim 4, wherein the displayed alert includes a field for receiving a dismiss alert code, the method further comprising:
receiving input of the dismiss alert code into the field; and
in response to the input of the dismiss alert code, silencing the audible output of the alert.

6. The computer storage media of claim 5, further comprising:
in response to the input of the dismiss alert code, sending an acknowledgment to the first computing device.

7. The computer storage media of claim 6, further comprising:
in response to receiving the acknowledgment, causing the first computing device to initiate a phone call to the second mobile device.

8. The computer storage media of claim 4, wherein the displayed alert includes a plurality of options for responding to the alert.

9. The computer storage media of claim 4, wherein the alert is displayed for a period of time before the alert is audibly output.

10. The computer storage media of claim 1, the method further comprising:
prior to sending information identifying the location of the second mobile device, comparing, by the second mobile device, the location of the second mobile device to an area associated with notification, and upon determining that the location of the second mobile device is within the area, sending the information identifying the location of the second mobile device to the first mobile device.

11. The computer storage media of claim 1, further comprising:
upon receiving the information identifying the location of the second mobile device, displaying a map on the first mobile device that includes an indication of the location of the second mobile device.

12. The computer storage media of claim 10, wherein the indication of the location of the second mobile device is configured to indicate whether a user of the second mobile device has acknowledged the alert, or, if the second mobile device has acknowledged the alert, to indicate how the second mobile device acknowledged the alert.

13. The computer storage media of claim 1, wherein the first computing device is a mobile device.

14. One or more non-transitory computer storage media storing computer executable instructions which when executed on a mobile device implement a method for causing the mobile device's volume settings to be automatically adjusted in response to receiving a notification from another mobile device, the method comprising:
storing, on the mobile device, a unique identifier, an emergency code, a dismiss alert code, and a remote map code;
receiving, at the mobile device, a notification that includes the unique identifier, an emergency code, and a remote map code, the notification being received from another computing device;
comparing the emergency code included in the notification to the emergency code stored on the mobile device;
upon determining that the emergency code included in the notification matches the emergency code stored on the mobile device, adjusting a volume setting on the mobile device so that the mobile device will output an audible sound when an alert is generated on the mobile device;
generating an alert indicating that the notification was received, the alert comprising a visible alert that is displayed on a display of the mobile device and an audible alert that is output from a speaker of the mobile device, the visible alert including a field for receiving the dismiss alert code;
receiving input of the dismiss alert code into the field;
ceasing the output of the audible alert;
comparing the remote map code included in the notification to the remote map code stored on the mobile device; and
upon determining that the remote map code included in the notification matches the remote map code stored on the mobile device, sending, to the other mobile device, information identifying a location of the mobile device.

15. The computer storage media of claim 14, wherein the method further comprises:
upon receiving input of the dismiss alert code, sending an acknowledgement to the other computing device.

16. A method, implemented by a first computing device that includes a processor and memory, for causing a volume setting of a second mobile device to be overridden so that a first user of the first computing device can immediately contact a second user of the second mobile device even when the volume setting of the second mobile device is set to silent, the method comprising:
receiving, by the first computing device, input from the first user that requests that a notification be sent to the second mobile device;
sending, by the first computing device, the notification to the second mobile device, the notification including a unique identifier and an emergency code that causes the volume setting of the second mobile device to be set to an audible level so that an alert is audibly output when the second mobile device receives the notification;
receiving an acknowledgement from the second mobile device, the acknowledgement identifying that the second user acknowledged the alert;
storing, on the first computing device, a unique identifier and an emergency code for the first computing device;
receiving, from a third mobile device, a second notification that includes the unique identifier for the first computing device and an emergency code;
comparing the emergency code included in the second notification to the emergency code for the first computing device;
upon determining that the emergency code included in the second notification matches the emergency code for the first mobile device, changing a volume setting of the first computing device to an audible level; and
generating an alert in response to the second notification, the alert being output audibly due to the volume setting having been changed to an audible level.

17. The method of claim 16, wherein the notification also includes a remote map code that causes the second mobile device to return an indication of a location of the second mobile device, the method further comprising:
receiving the indication of the location of the second mobile device; and
displaying a map that includes the indication.

* * * * *